(12) United States Patent
Ueda et al.

(10) Patent No.: US 7,042,588 B2
(45) Date of Patent: May 9, 2006

(54) INFORMATION PROCESSING APPARATUS, INFORMATION PROCESSING METHODS AND PRINT SYSTEMS

(75) Inventors: Akira Ueda, Kanagawa (JP); Tsunehiro Tsukada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 980 days.

(21) Appl. No.: 09/994,865

(22) Filed: Nov. 28, 2001

(65) Prior Publication Data

US 2002/0063891 A1    May 30, 2002

(30) Foreign Application Priority Data

Nov. 29, 2000  (JP)  ............................. 2000-363011
Nov. 29, 2000  (JP)  ............................. 2000-363012

(51) Int. Cl.
  *G06F 15/00*  (2006.01)
  *G06F 15/16*  (2006.01)
(52) U.S. Cl. .................... 358/1.15; 358/1.15; 709/206
(58) Field of Classification Search ............... 358/1.15, 358/1.18, 452; 235/384, 462; 382/224, 382/218, 225; 707/9, 10; 399/194; 709/206, 709/217

See application file for complete search history.

(56) References Cited

U.S. PATENT DOCUMENTS 6,327,049 B1 * 12/2001 Ohtsuka .................... 358/1.18
2002/0059235 A1 * 5/2002 Jecha et al. .................... 707/9

OTHER PUBLICATIONS

U.S. Appl. No. 09/994,872, filed Nov. 28, 2001.

* cited by examiner

*Primary Examiner*—Kimberly Williams
*Assistant Examiner*—Saeid Ebrhimi-Dehkordy
(74) *Attorney, Agent, or Firm*—Fitzpatrick, Cella, Harper & Scinto

(57) ABSTRACT

In a print system, where whole processing to generate final print data is carried out at a server, concentrated requests from many and unspecified clients, being the feature of Web communication, will increase the load on the server.

For overcoming it, it is made feasible to distribute data necessary for generation of chit print data by overlay processing, from the server to a client or to a print server and execute the overlay processing at the client or at the print server to generate the chit print data.

29 Claims, 43 Drawing Sheets

FIG. 4

MONTHLY OVERTIME WORK

YEAR: N1  MONTH: N2
NAME: S1

| | 1 | 2 | 3 | 4 | 5 | 6 | 7 | 8 | 9 | 10 |
|---|---|---|---|---|---|---|---|---|---|---|
| EVENING | N3 | N4 | N5 | N6 | N7 | N8 | N9 | N10 | N11 | N12 |
| MIDNIGHT | | | | | | | | | | |
| | 11 | 12 | 13 | 14 | 15 | 16 | 17 | 18 | 19 | 20 |
| EVENING | | | | | | | | | | |
| MIDNIGHT | | | | | | | | | | |
| | 21 | 22 | 23 | 24 | 25 | 26 | 27 | 28 | 29 | 30 |
| EVENING | | | | | | | | | | |
| MIDNIGHT | | | | | | | | | | |

TOTAL OVERTIME WORK: N50
TOTAL MIDNIGHT WORK: N51

| SIGNATURE | S1 | MANAGER | |
|---|---|---|---|

FIG. 5

| CHIT TEMPLATE ID | INDEX | SIZE | VALUE |
|---|---|---|---|
| xxxxx | S1 | 20 | xxxxx |
| | N1 | 12 | 1998 |
| | N2 | 12 | 10 |
| | N3 | 10 | 0 |
| | ... | ... | |
| | N49 | 10 | 1.5 |
| | N50 | 12 | 30 |
| | N51 | 12 | 7.5 |

| | DISTRIBUTION DATA SIZE WITH CHIT FORM (KB) | DISTRIBUTION DATA SIZE WITHOUT CHIT FORM (KB) | RATIO (%) |
|---|---|---|---|
| CHIT-A | 9.0 | 0.5 | 5.56 |
| CHIT-B | 14.4 | 0.7 | 4.86 |
| CHIT-C | 25.0 | 0.7 | 2.8 |
| CHIT-D | 712.7 | 0.3 | 0.04 |
| CHIT-E | 119.0 | 0.5 | 0.4 |

FIG. 38

MONTHLY SCHEDULE    YEAR: 1999    MONTH: 10    NAME: TANAKA

| | 1 | 2 | 3 | 4 | 5 | 6 | 7 | 8 | 9 | 10 |
|---|---|---|---|---|---|---|---|---|---|---|
| EVENING | 1 | 1 | 0 | 0 | 0 | 0 | 0 | 0 | 0 | 0 |
| MIDNIGHT | 0 | 0 | 0 | 0 | 0 | 0 | 0 | 0 | 0 | 0 |
| | 11 | 12 | 13 | 14 | 15 | 16 | 17 | 18 | 19 | 20 |
| EVENING | 0 | 0 | 0 | 0 | 0 | 0 | 0 | 0 | 0 | 0 |
| MIDNIGHT | 0 | 0 | 0 | 0 | 0 | 0 | 0 | 0 | 0 | 0 |
| | 21 | 22 | 23 | 24 | 25 | 26 | 27 | 28 | 29 | 30 |
| EVENING | 0 | 0 | 0 | 0 | 0 | 0 | 0 | 0 | 0 | 0 |
| MIDNIGHT | 0 | 0 | 0 | 0 | 0 | 0 | 0 | 0 | 0 | 0 |
| | 31 | | | | | | | | | |
| EVENING | 1 | | | | | | | | | |
| MIDNIGHT | 1 | | | | | | | | | |

DATA A

CHIT TEMPLATE=MONTHLY SCHEDULE
N1=1999
N2=10
name=TANAKA
X1=1
Y1=0
X2=1
Y2=0
. . .
. . .
CHIT TEMPLATE DATA
IMAGE DATA

DATA B

CHIT TEMPLATE=MONTHLY SCHEDULE
N1=1999
N2=10
name=TANAKA
X1=1
Y1=0
X2=1
Y2=0
. . .
. . .
CHIT TEMPLATE DATA

FIG. 45

| |
|---|
| PROGRAM CODE FOR FLOWCHART OF FIG. 6 |
| PROGRAM CODE FOR FLOWCHART OF FIG. 7 |
| PROGRAM CODE FOR FLOWCHART OF FIG. 8 |
| PROGRAM CODE FOR FLOWCHART OF FIG. 10 |
| PROGRAM CODE FOR FLOWCHART OF FIG. 14 |
| PROGRAM CODE FOR FLOWCHART OF FIG. 17 |
| PROGRAM CODE FOR FLOWCHART OF FIG. 18 |
| PROGRAM CODE FOR FLOWCHART OF FIG. 19 |
| PROGRAM CODE FOR FLOWCHART OF FIG. 20 |
| PROGRAM CODE FOR FLOWCHART OF FIG. 25 |
| PROGRAM CODE FOR FLOWCHART OF FIG. 29 |
| PROGRAM CODE FOR FLOWCHART OF FIG. 34 |
| |

| PROGRAM CODE FOR FLOWCHART OF FIG. 6 |
|---|
| PROGRAM CODE FOR FLOWCHART OF FIG. 7 |
| PROGRAM CODE FOR FLOWCHART OF FIG. 8 |
| PROGRAM CODE FOR FLOWCHART OF FIG. 40 |
| PROGRAM CODE FOR FLOWCHART OF FIG. 41 |
| PROGRAM CODE FOR FLOWCHART OF FIG. 44 |
|  |

INFORMATION PROCESSING APPARATUS, INFORMATION PROCESSING METHODS AND PRINT SYSTEMS

BACKGROUND OF THE INVENTION

1. Field of the Invention

The present invention relates to network print systems configured to generate print data, e.g., of a chit and print the chit via a network.

2. Related Background Art

With quick development of Internet and increase in the number of Web servers, business tasks are being directed toward processing on Web. When personal computers, connected to a network, are solely loaded with a Web browser capable of display of information and entry of information, it is feasible to handle business tasks by the Web browser and Web server, which is becoming widespread. In this case, information necessary for performance of the tasks is exchanged between the Web server and the Web browser.

The Web server receives input information from the Web browser, processes the information, and sends the processed information again to the Web browser. The Web server presents display of the thus processed information. These actions are repeated to carry out the tasks.

There was, however, an issue in the performance of tasks by the Web browser and Web server, concerning the print operation indispensable for the performance of tasks. In particular, it was impossible to make satisfactory prints according to a format, e.g., for chits.

The typical Web browsers provide the print function, but this function is to make a printer under the Web browser (or a printer under a computer on which the Web browser is active) print a hard copy of an image displayed on the Web browser. In this print method, there arises an issue of how to make a page break for an image over a sheet size or for an image across plural pages, and it is often the case that the resultant print does not meet a user's desire.

SUMMARY OF THE INVENTION

A conceivable solution to it is a print system in which a print system server incorporating the Web server generates printing data (e.g., chit print data) in response to an instruction from the Web browser and delivers it to a client with the Web browser being active. In this print system, the server always generates printing data according to individual instructions and sequentially sends it to the client.

An issue in this print system is, however, increase in the load on the server against concentrated requests from many and unspecified clients being the feature of Web communications, because the processing to generate the final printing data is carried out all on the server side. Further, when the printing data is generated using a printer driver on the server side, in order to print the printing data on the client side, the same driver as the printer driver present on the server side has to be prepared on the client side.

Since the printing data generated on the server side can amount to a high volume of data, depending upon its contents, it must be a great load on the network during transmission of data to the client.

Therefore, the present invention has been accomplished in order to solve the issues discussed above, and makes it feasible to deliver data necessary for generation of chit print data by overlay processing, from the server to the client and allow the client to generate the chit print data through execution of the overlay processing. The present invention implements a function of permitting the client to retain data once delivered from the server and thereafter avoiding redundant delivery of the data once retained at the client, from the server, thereby efficiently reducing the volume of data through the network.

In the aforementioned print system, the flow of printing follows (1) or (2) below. (1) Printing data is delivered to each of clients requesting print and the data is sent from each client to a printer. (2) A chit form and data are delivered to each of clients requesting print, and each client overlays the data on the chit form to generate printing data.

In (1), however, since the individual clients need to perform the data transmission and printing management for printing jobs, the individual clients have to possess data transmission and processing performance over a certain level.

The volume of transmitted data can be smaller in (2) than in (1), but the individual clients have to carry out the overlay process of the data on the chit form, which posed the drawback that the individual clients had to possess much higher processing performance.

Accordingly, the present invention has been accomplished in order to give a solution to the above issues, and makes it feasible to carry out efficient printing without imposing a too heavy load on the client, in such a way that the data necessary for generation of printing data is delivered to an output server instead of the client and the output server converts the data thus delivered, to printer-digestible data.

While the load on the server and network can be reduced by executing the generating operation of the final printing data on the client side at the output server, the data delivered from the server can be relatively easily analyzed by a third party except for users of the system, however. For this reason, it cannot be denied that there is a possibility of falsification of information against the data.

Therefore, the present invention is further directed to a technology of inserting a description indicating a data compression method and an enciphering method for prevention of falsification into the data for generation of image delivered from the server and enabling execution of compression and cryptography of data by those means, thereby enhancing the security for data delivery.

BRIEF DESCRIPTION OF THE DRAWINGS

FIG. 4 is an example of a chit template used in printing;

FIG. 5 is a table of variable data to be embedded in graphic data;

FIG. 21 is a diagram to provide comparison among sizes of distribution data from the server on the basis of five types of sample chits;

FIG. 38 is a view of chit print data after insertion of variable data in a chit template;

FIG. 39 is a diagram showing an example of data delivered from server 106 to output server 3500;

FIG. 45 is a diagram showing a memory map in a state in which programs are loaded on the memory and can be executed by a CPU;

DETAILED DESCRIPTION OF THE PREFERRED EMBODIMENTS

<Chit Print System>

Figure 1:
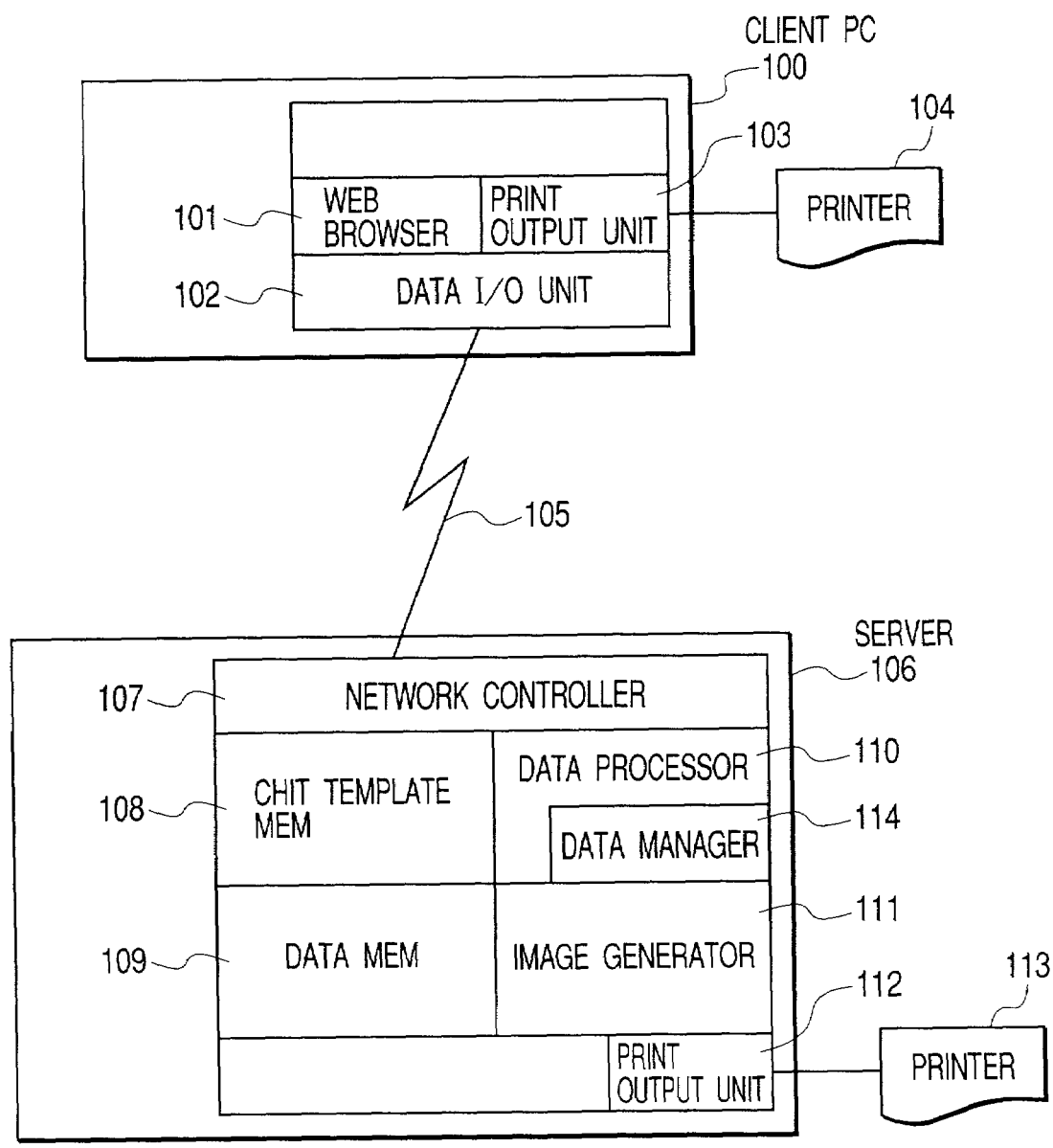
FIG. 1 is a functional block diagram of a chit print system.

FIG. 1 is a functional block diagram of a chit print system. Reference numeral 100 designates an information processing apparatus such as a personal computer (PC) or the like, which is a client computer of the chit print system (hereinafter referred to as client 100). Numeral 101 denotes a Web browser. The Web browser 101 is an application program having a function of displaying a document data file (Web document) described in HTML (Hyper Text Markup Language) or the like, and displays a Web document received from a Web server. The Web browser does not function only to display the Web document simply, but also functions to accept entry of data on a screen and send it back to the Web server. The Web browser takes in the Web document from the server in accordance with an input URL.

Numeral 102 represents a data I/O unit for input/output of data from or to server 106 of the chit print system (hereinafter referred to as server 106). The data I/O unit 102 is configured to exchange data with the server 106 through network 105 such as a telephone line, a LAN, or the like, and handles layers lower than HTTP. Print output unit 103 converts print data described in a prescribed format, to a data format according to an output format dependent upon a printer, and makes printer 104 print the data; or saves the data in the output format of the printer, which was received from the server 106 or the like, in a spool, and makes the printer 104 print it.

Numeral 103 indicates the print output unit for converting an image displayed on the Web browser 101, to standard print data in response to an instruction from the Web browser 101. This print output unit is generally called a print driver.

Numeral 113 designates a printer. Numeral 105 denotes a network connecting the server 106 with the client 100. The network can be implemented in various forms, including the LAN (Local Area Network), Internet, wireless communication, and so on. The network 105 herein is assumed to be ready for communication procedures under the Web environment (e.g., TCP/IP protocol and HTTP protocol).

Numeral 106 stands for an information processing apparatus as a server. Numeral 107 represents a network communication controller having the function of the Web server.

The Web server function herein is a function of supporting HTTP (Hyper Text Transfer Protocol), FTP (File Transfer Protocol), etc., and the Web server is able to send, e.g., a document data file (Web document) described in HTML (Hyper Text Markup Language), which was designated by a URL (Uniform Resource Locator), to the client 100 on the network in reply to a request.

Numeral 108 is a chit template memory, which stores chit templates (or chit template data) indicating print chit forms used in print of chits. The chit template memory 108 stores the chit templates and others for print of chits. The chit templates are provided corresponding to respective Web documents read out of the server 106 by the client 100. When the server 106 sends a Web document corresponding to a chit template, to the client 100, the server 106 stores an ID corresponding to the Web document. Each chit template stored in the chit template memory is associated with an ID of a corresponding Web document as a chit template ID.

Numeral 109 indicates a data memory constructed of databases, which store data for each of business tasks. This data can be data provided in a database form, or input data on the Web browser, which was stored in the data memory as it was. Numeral 110 stands for a data processor, which executes data processing according to an application program for each business task.

Numeral 111 denotes an image generator for generating chit print data according to a prescribed format. The image generator 111 generates the chit print data as a combination of a chit form with data overlaid thereon, in a predetermined format that can be interpreted by print output unit 112. Numeral 112 designates the print output unit for converting the data generated in the image generator, to a printer-digestible format, which is generally called a printer driver.

Numeral 114 denotes a data management unit, which efficiently saves chit print data once generated and sends an address of the data to the client 100. Particularly, the data manager 114 functions to generate new chit print data for a modified print chit form and notify the user of it.

Figure 3:
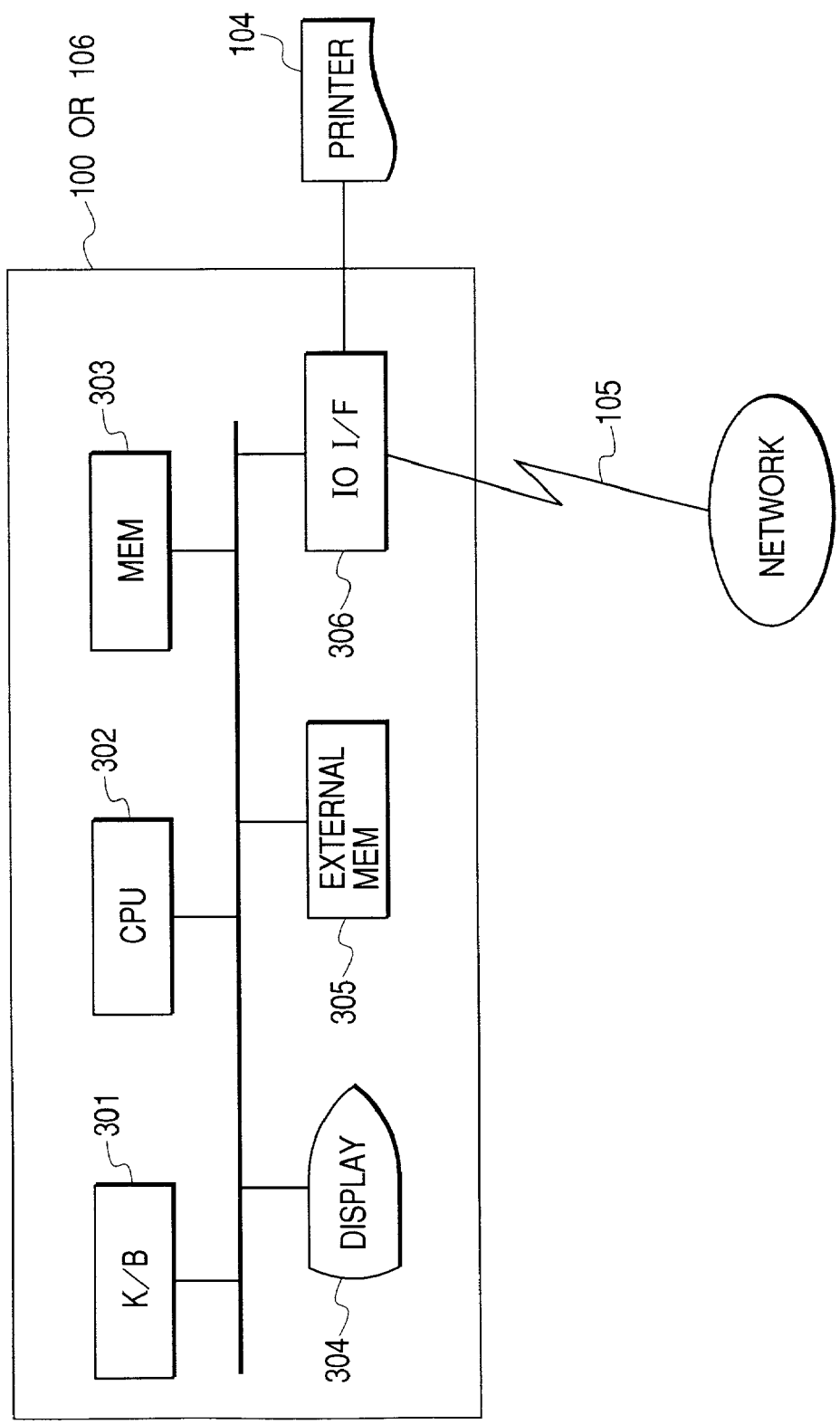
FIG. 3 is a block diagram of hardware showing a configuration of a client and a server.

FIG. 3 is a block diagram of hardware showing the structure of client 100 and server 106. The units (102, 103, 107, 110, 111, 112, 114) of FIG. 1 are implemented by loading respective corresponding programs in memory 303 and executing them by CPU 302 of a computer. These programs, and the data memory 109 or the chit template memory 108 are stored in external memory 305 such as a hard disk or the like. The external memory 305 may be a removable storage medium such as a floppy disk, a CD-ROM, or the like. Display 304 displays the Web browser or an image. I/O interface 306 is a port for connection to external equipment such as the network 105, the printer 104, and so on. The user is allowed to input necessary data through keyboard and/or pointing device 301.

<Display on Web Browser>

A print instruction from Web browser 101 will be described below. The data processor 110 performs through communication with the data I/O unit 102, acceptance of data entered on the Web browser 101, analysis thereof, a search for data according to the thus accepted data, and transmission of the result of the search to the data I/O unit. The Web browser 101 displays buttons according to a Web document delivered from the data processing unit 110. When the user presses the buttons, various requests are sent through the data I/O unit 102 to the server 106. The buttons are displayed on the display of the computer and the user selects and presses either of them through the pointing device, such as a mouse, and/or the keyboard.

Figure 2:
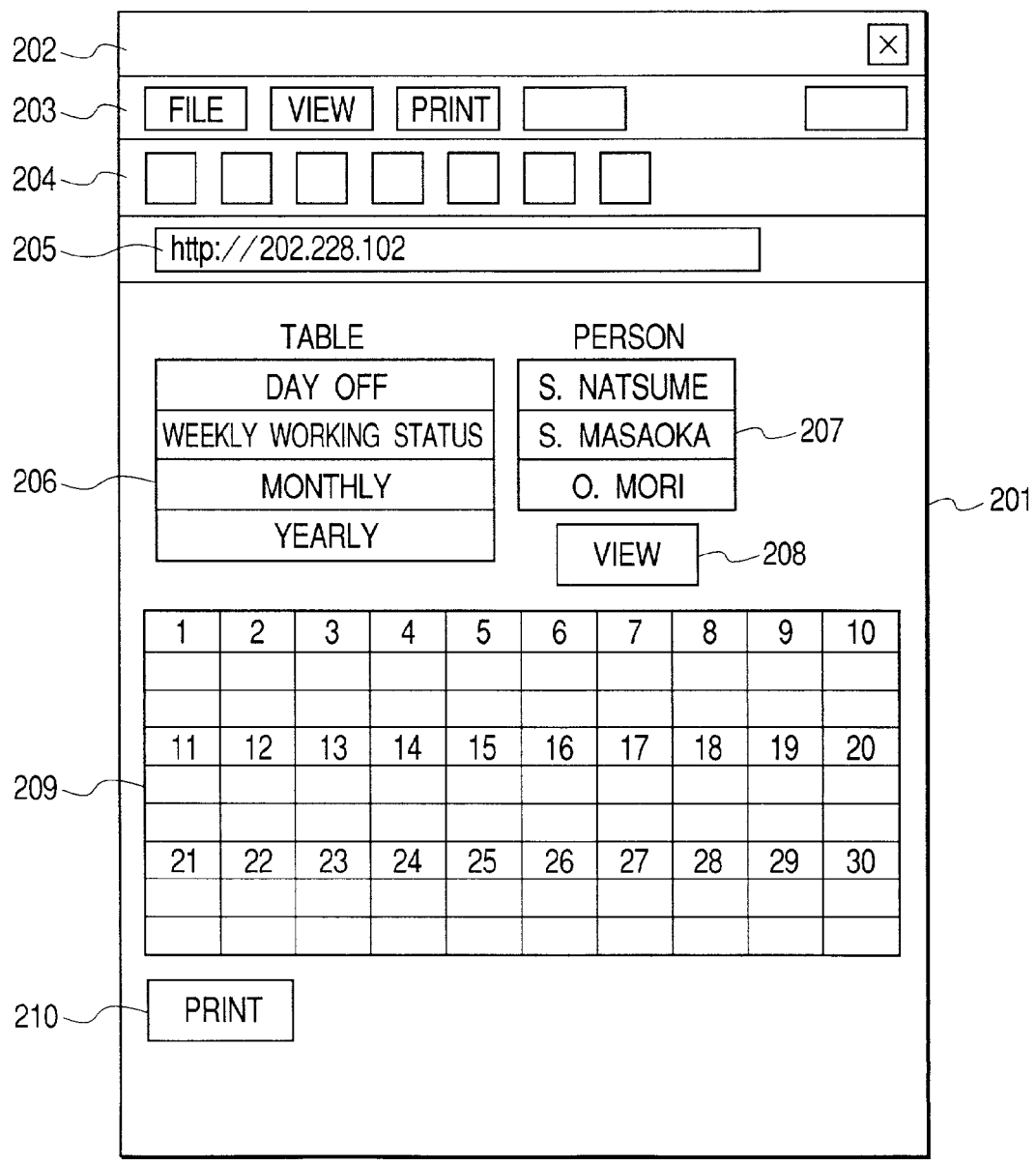
FIG. 2 is a view of a page for performance of a business task, which is displayed on a common Web browser.

Particularly, a print button in this chit print system is located in an image display area of the Web browser 101. FIG. 2 is a diagram showing a display screen of a page for processing of a business task, on the typical Web browser 101. Numeral 201 designates a window of Web browser 101 displayed on a monitor or display of the client 100. A window title is indicated in an area of 202. Commands on the Web browser 101 are displayed in areas 203 and 204. A command for print of an image displayed on the Web browser 101 is also provided there. Numeral 205 denotes a text field for entry of an address of server 106 to make access (e.g., URL: Uniform Resource Location).

Numerals 206 and 207 are fields for permitting the user to select each item. Numeral 208 represents a view button. When this view button is pressed down, items selected in the areas 206 and 207 by the user are sent to the server 106 and a reply from server 106 is awaited. Then the server 106 generates display data of a chit based on a chit name selected in the area 206 and a name of a person selected in the area 207, and sends it to the client 100. The Web server displays an image of the chit like one 209, based on the chit display data. In the case of FIG. 2, the server 106 searches the data memory 109 for data concerning the monthly working status of the current month of S. MASAOKA, retrieves the corresponding data, generates chit display data (a Web document for display of an image of the chit herein) based on the retrieved data, and sends it to the client 100. Then the monthly chit is displayed in the area 209 of the Web browser. Further, numeral 210 stands for a print button in this chit print system.

When the client 100 reads a page of a chit out of the server 106, the Web browser 101 is activated at client 100. When the user provides input of http://202.228.102, as shown in FIG. 2, the server 106 sends a Web document including the boxes 206, 207, 208, 209 and 210, to the Web browser.

<Generation and Print of Print Data at Server 106>

Let us now explain the operation carried out when the print button 210 is pressed down. In the print process, a document to be printed is prepared by inserting the data into a print chit template corresponding to a format ID. When the print button is pressed, information indicating the press of the print button is sent to the server 106. The server 106 searches the chit template memory 108 for the chit template, based on the ID attached to the Web document (chit page) having been sent to the client 100 requesting the print. Each chit template is stored so as to be able to be searched for from a format ID.

FIG. 4 presents an example of a chit template used in print. The graphic data (chit data) in the chit template is categorized into fixed data and variable data. A character string 401 indicating a chit title, numeral 402 indicating the frame, days, etc., and character strings and frame 403 are fixed data. Values (chit data) obtained from the database or the like are embedded in s1, n1 to n12, n50 and n51 in areas 404 and 405.

Further, FIG. 5 shows a table of variable data to be embedded in the graphic data of FIG. 4.

This table is prepared for each chit template and is provided with a chit template ID 504 to enable identification of the chit template. In the table of FIG. 5, for each of the variable data s1 and n1 to n51, there are an index of variable data (501), a character size (502) for display of the variable data, and an actual value of the variable data (a numeral or a character string) (503) of the variable data stored. The chit print data is generated by merging the chit template of FIG. 4 with the values of various data of FIG. 5, based on the indices.

Figure 6:
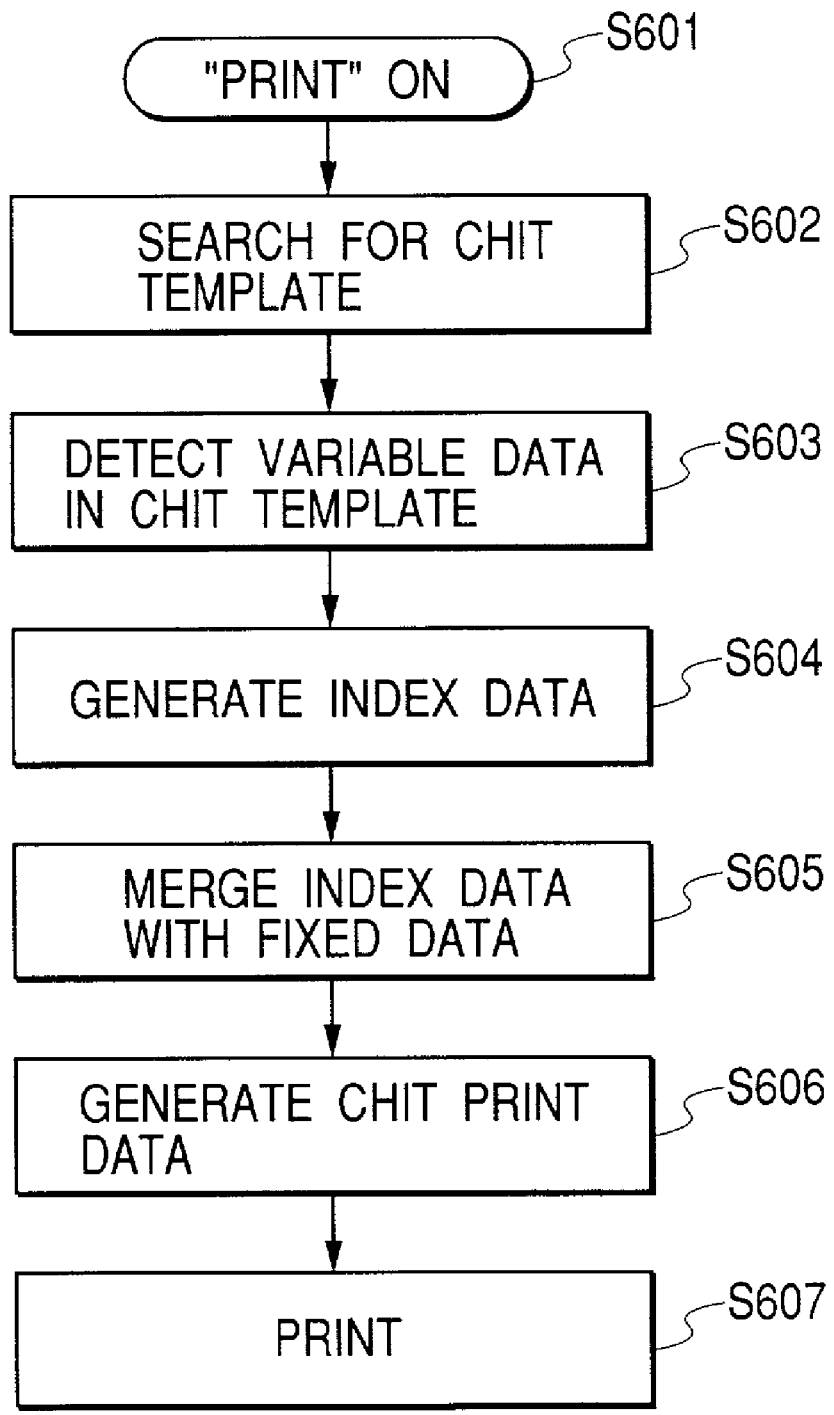
FIG. 6 is a flowchart of processing in which the server actually generates and outputs the chit print data.

FIG. 6 is a flowchart of processing in which the server 106 actually generates the chit print data and outputs it. This processing is executed at the server 106 when the server 106 receives the information indicating the press of the print button 210. In this processing, steps S601, S602, S603 and S604 are executed by the data processor 110, steps S605 and S606 by the image generator 111, and step S607 by the print output unit 112. In the processing of FIG. 6, the printing operation is carried out by the printer 113.

When at first step S601 the server 106 receives the button press information, the data processor 110 searches for a chit template to be used, at step S602. Since the server stores IDs of Web documents having already been sent to the client 100, the chit template to be used can be searched for, based thereon.

At step S603 the processor 110 detects positions of boxes of variable data to be incorporated in the chit template detected by the search. Then the index data is generated at step S604. Namely, values of the variable data in the table of FIG. 5 are described at the positions of the boxes of the variable data extracted at step S603, according to their indices. This operation yields the index data describing the variable data part.

At next step S605, the image generator 111 merges the fixed data part of the chit template obtained at step S602 with the index data generated at step S604. At step S606, the image generator 111 generates chit print data described in an actual image format, i.e., in a format that can be interpreted by the print output unit 112, from the resultant data of the merging at step S605.

At step S607, the print output unit 112 converts the chit print data generated at step S606, to a print image that can be printed by the printer, for example, a print image in a page description language, and outputs it to the print spool. In this way, the print image based on the chit print data is printed out at the printer 113.

<Generation and Transfer of Print Data at Server 106>

Figure 7:
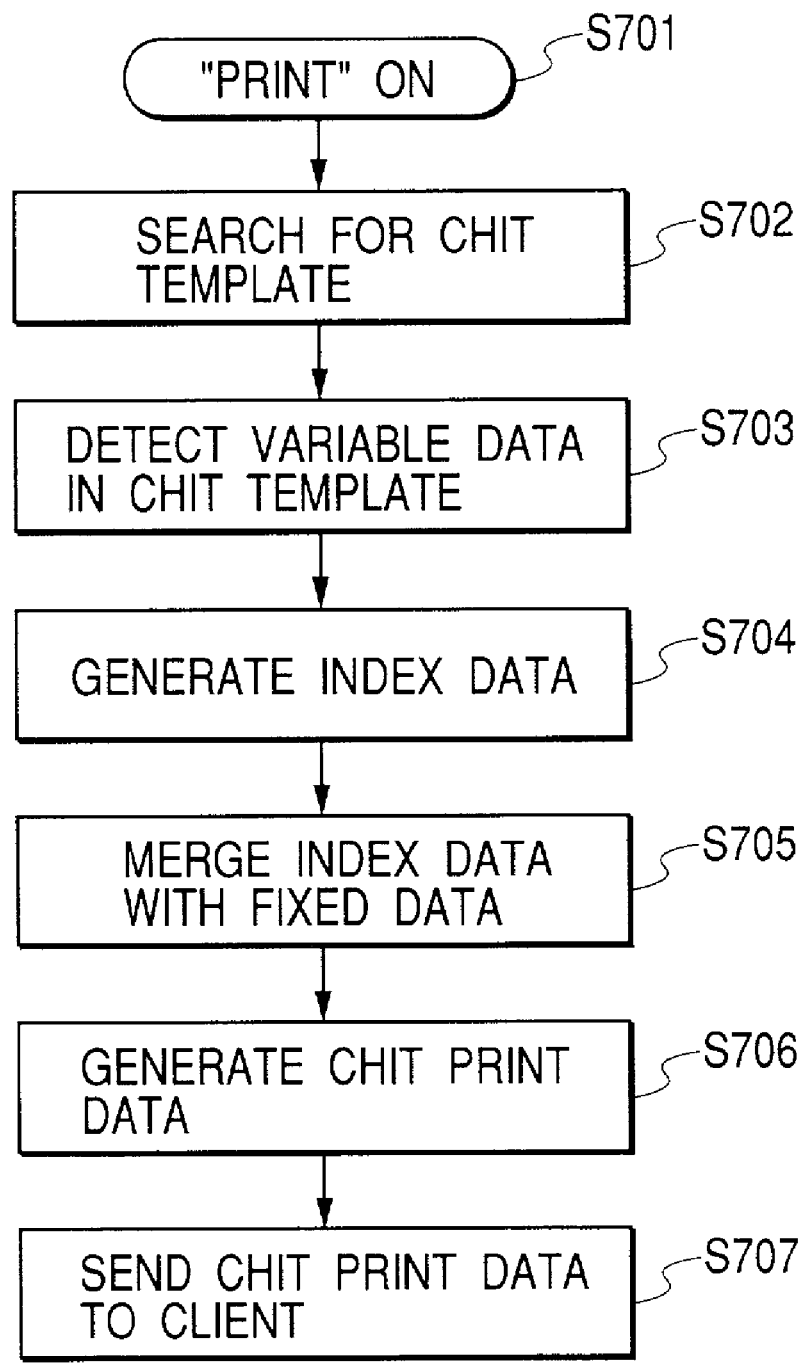
FIG. 7 is a flowchart of processing in which the server actually generates the chit print data and sends it to the client.

FIG. 7 is a flowchart of processing in which the server 106 actually generates the chit print data and sends it to the client 100. This processing is executed at the server 106 when the server 106 receives the press information of the print button 210. In this processing, steps S701, S702, S703 and S704 are executed by the data processor 110, steps S705 and S706 by the image generator 111, and step S707 by the network communication controller 107. In the processing of FIG. 7, the printing operation is carried out by the printer 104.

When at first step S701 the server 106 receives the press of the button, the data processor 110 searches for the chit template to be used, at step S702. Since the server stores the IDs of Web documents having already been sent to the client 100, the data processor 110 can search for the chit template to be used, based thereon.

At step S703, the data processor 110 detects the positions of boxes of the variable data to be incorporated in the chit template detected by the search. At next step S704, the index data is prepared. Namely, values of the variable data in the table of FIG. 5 are described at the positions of the boxes of the variable data extracted at step S703, according to their indices. This operation yields the index data describing the variable data part.

At next step S705, the image generator 111 merges the fixed data part of the chit template obtained at step S702 with the index data generated at step S704. At step S706, the image generator 111 generates the chit print data described in the actual image format, i.e., in the format that can be interpreted by the print output unit 112, from the resultant data of the merging at step S705.

At step S707, the chit print data generated at step S706 is sent to the client 100. Although this step was described as a step of sending the data to the client 100 in order to simplify the description, the actual operation is not to send the resultant chit print data itself to the client 100, but to send a URL of a data file of the resultant chit print data to the client 100. Using the URL received by the Web browser, the client 100 automatically requests transmission of the data file through FTP instead of HTTP and receives the data file from the server 106.

<Reception and Print of Print Data at Client 100>

Figure 8:
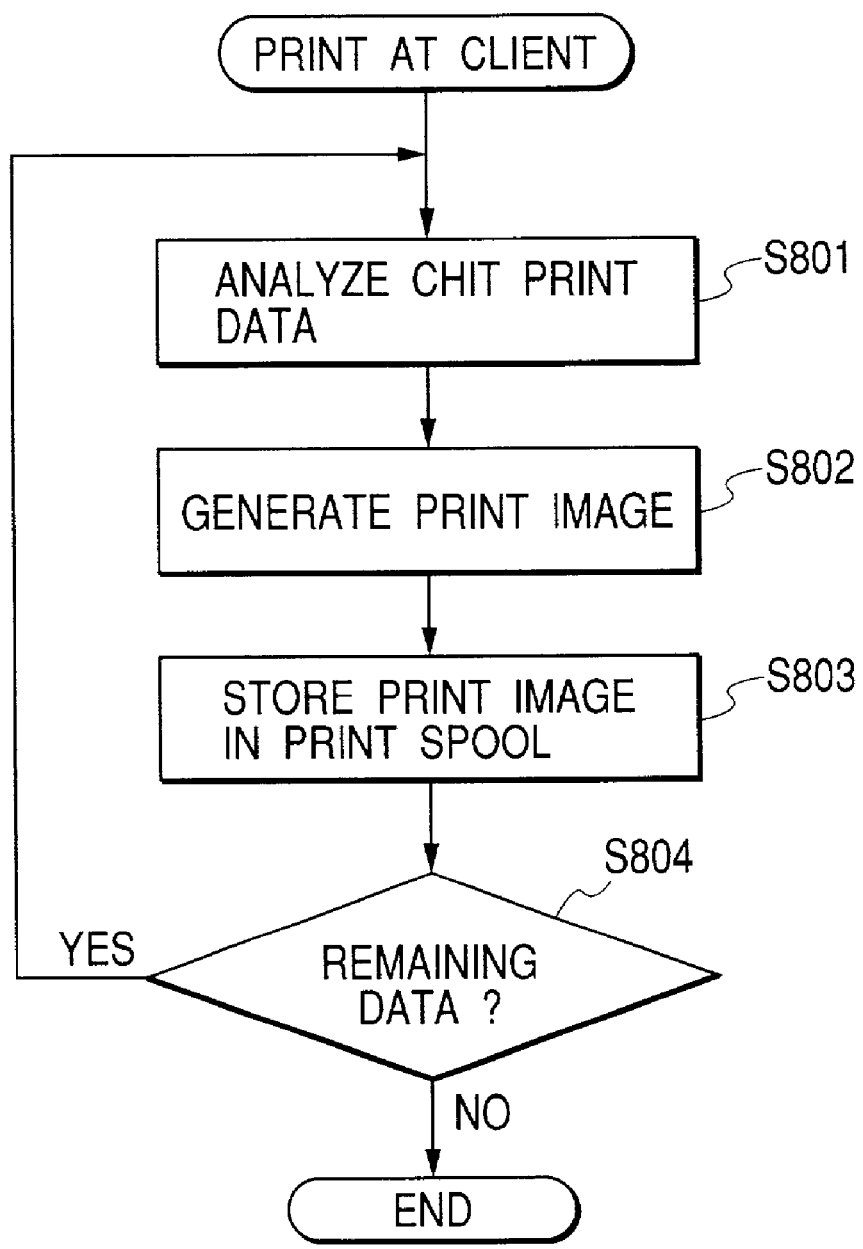
FIG. 8 is a flowchart of processing carried out by the client receiving the chit print data from the server.

FIG. 8 is a flowchart of processing executed by the client 100 when the client receives the chit print data sent from the server 106 at step S707 of FIG. 7.

At first step S801, the print output unit 103 analyzes the chit print data thus received, and selects a printer suitable for the chit print data received. Since the client has only one printer in the configuration of FIG. 1, the printer 104 is selected. At step S802, the print output unit 103 generates a print image that can be printed by the printer 104, based on the result of the analysis. The print output unit 103 stores the print image in the print spool at step S803. Then the printer 104 sequentially provides print output of the image data. The above processing is repeated before all the received chit print data is analyzed and converted to print images.

The above procedure permits the client 100 to designate the output data through use of the Web browser and execute the printing in an appropriate format. When the chit is printed by use of the chit template generated for print, different from the print of the chit displayed on the browser, the image generated through use of the Web browser can be printed out as a print with high quality. At the server 106 or at the client 100, either of the printers can be made to print the chit with high quality according to user's convenience. Since only the server 106 stores the chit templates and also executes the merging with data, the client 100 is able to print the chit with high quality from the server 106 as long as it is simply loaded with the Web browser commercially available. For this reason, the load is light on the client 100 and it is thus possible to utilize an inexpensive personal computer with relatively low processing performance or a personal digital assistant having only the Web browser function.

<Client Site Making>

In the chit print system described above, the server 106 generated the chit print data, but it is also possible to employ such a configuration that the server 106 sends the necessary chit form and chit data to the client 100 as occasion demands and that the client 100 generates the chit print data. This will be called a client site making function.

Figure 9:
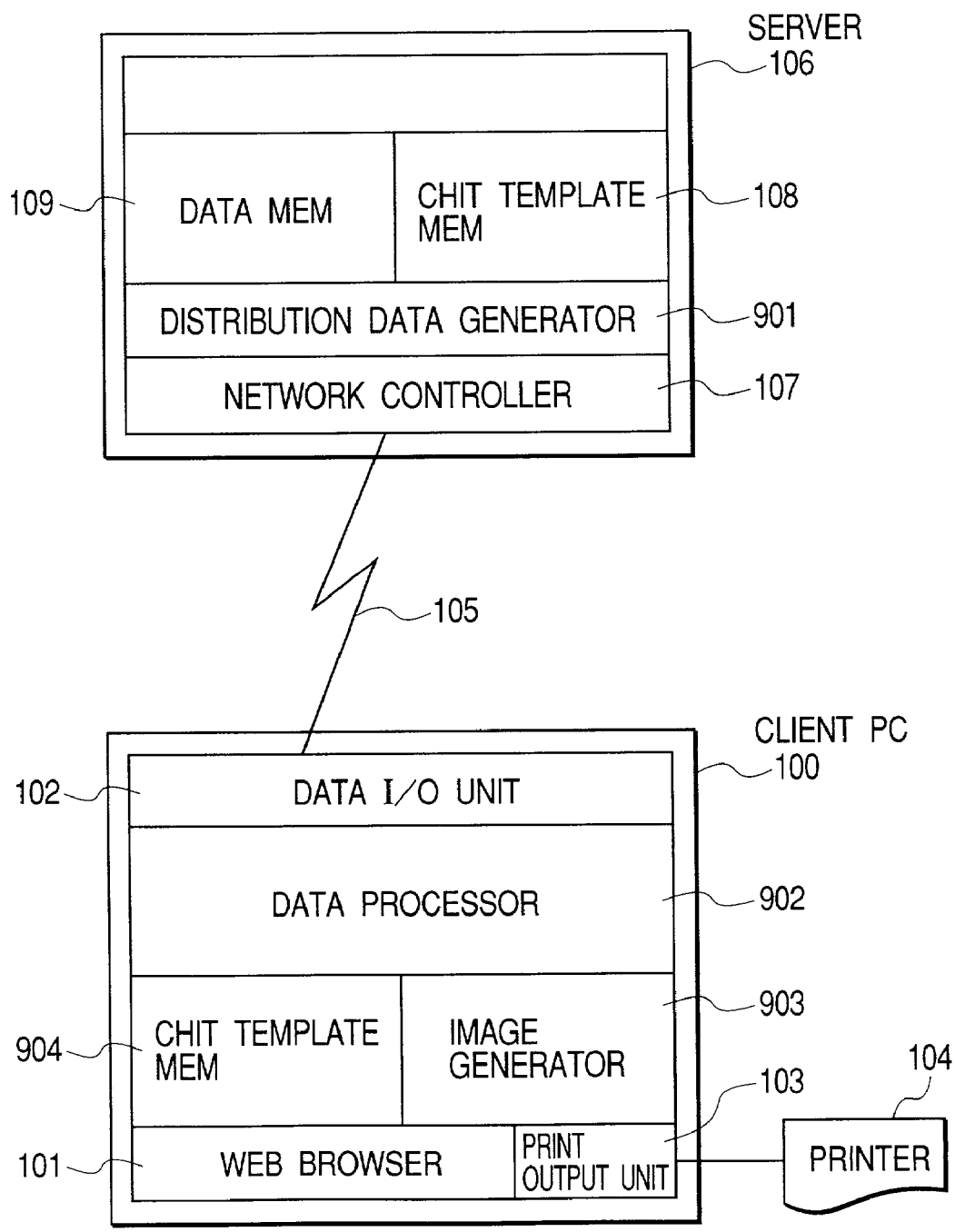
FIG. 9 is a functional block diagram of a chit print system capable of providing a client site making function.

FIG. 9 is a functional block diagram of a chit print system capable of providing the client site making function. In this print system, the server 106 has a new component of distribution data generator 901, while the client 100 has new components of data processor 902, chit template memory 904, and image generator 903. The other functional structure is substantially the same as in FIG. 1.

The distribution data generator 901 is a unit for generating distribution data as the resultant of composition of the data and chit form (chit template) necessary for generation of image, in response to a request from the client 100. The data processor 902 analyzes the distribution data generated by the distribution data generator 901 and restores the data and chit form (chit template) necessary for generation of image. The chit template memory 904 is a unit for storing a chit form restored by the data processor 902. The image generator 903 generates chit print data according to a predetermined format. The print output unit 103 is a print output unit for converting the data generated by the image generator 903, into the printer-digestible format, which is generally called a printer driver.

<Processing at Server 106 in Client Site Making>

Figure 10:
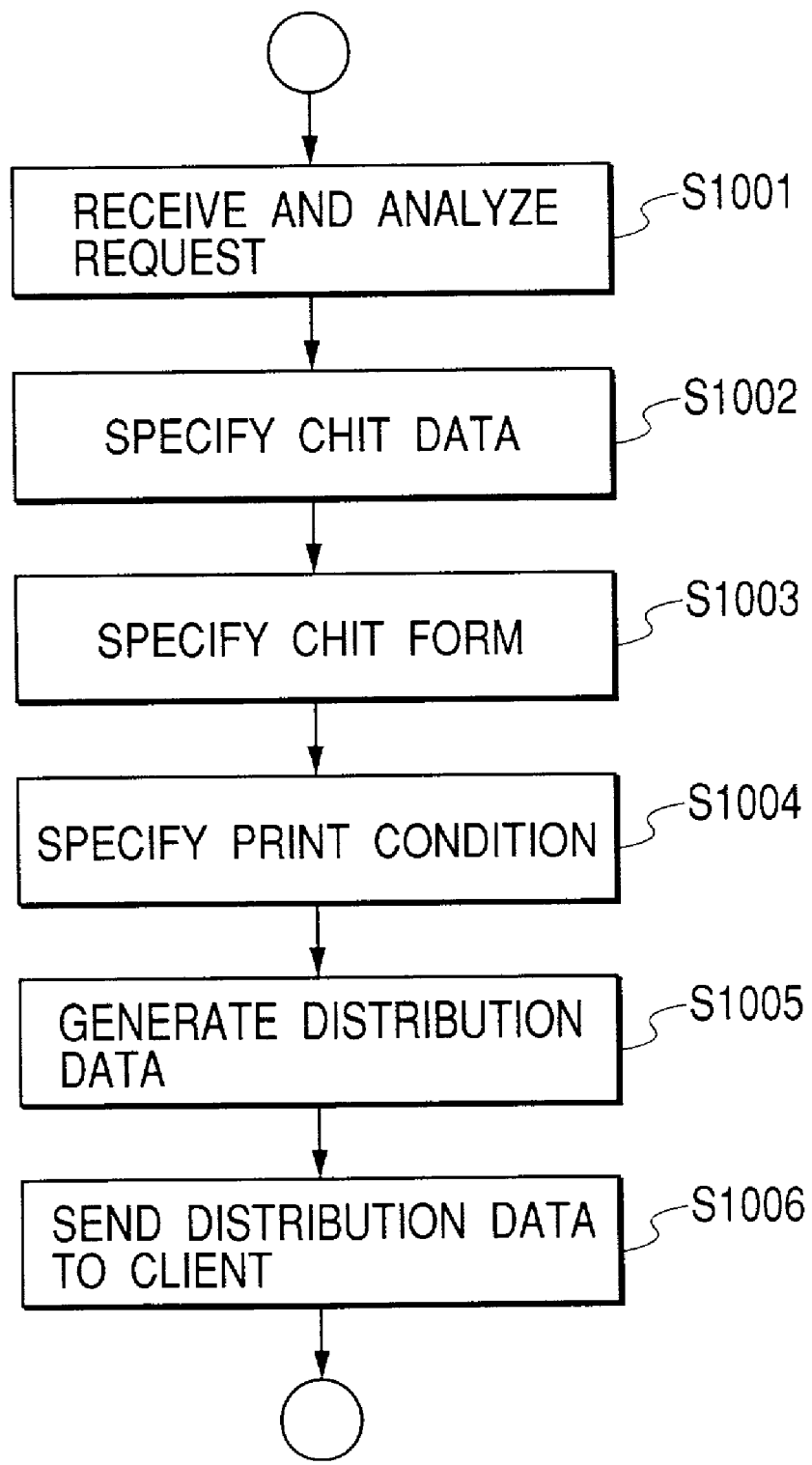
FIG. 10 is a flowchart showing a flow of processing up to generation of distribution data, which is carried out by the server receiving a print request from the client.

The following will describe the flow for executing the generation and print of chit print data at the client 100, which is a feature of the print system of FIG. 9. FIG. 10 is a flowchart to show the flow of processing for generation of distribution data at the server 106 receiving a print request from the client 100. Steps S1001, S1002, S1003, S1004 and S1005 are executed by the distribution data generator 901, and step S1006 by the network communication controller 107.

At first step S1001 the distribution data generator 901 analyzes the request (HTTP request) received from the Web browser 101, and at steps S1002 and S1003 the distribution data generator 901 specifies data necessary for generation of the chit print data requested by the client 100; particularly, a chit form and chit data. At further step S1004, the distribution data generator 901 specifies printer information, the number of prints, etc. (which will be called together a print condition) for execution of print by the printer after generation of an image at the client 100.

At step S1005, the distribution data generator 901 synthesizes one data from the information necessary for the generation of the image, which was specified at steps S1002, S1003 and S1004, so as to generate the distribution data. At next step S1006, the network communication controller 107 sends the distribution data thus generated, to the client 100.

Figure 11:
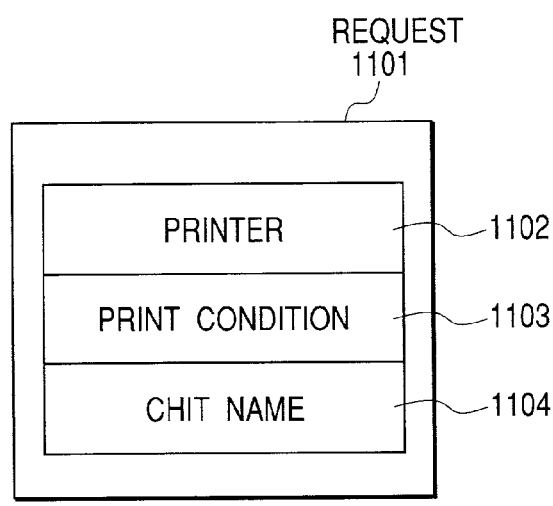
FIG. 11 is a diagram showing information included in a print request (HTTP request) received from the client.

FIG. 11 shows the information included in the print request (HTTP request) received from the client 100. Numeral 1101 designates the HTTP request itself sent from the client 100. Numeral 1102 denotes output printer information concerning the printer designated at the client 100. Numeral 1103 represents the print condition including a name of a chit designated for the generation of image, the number of prints, designation of both-side or single-side printing, designation of a tray of the printer, and so on. Numeral 1104 indicates the chit name for print selected at the client 100.

Figure 12:
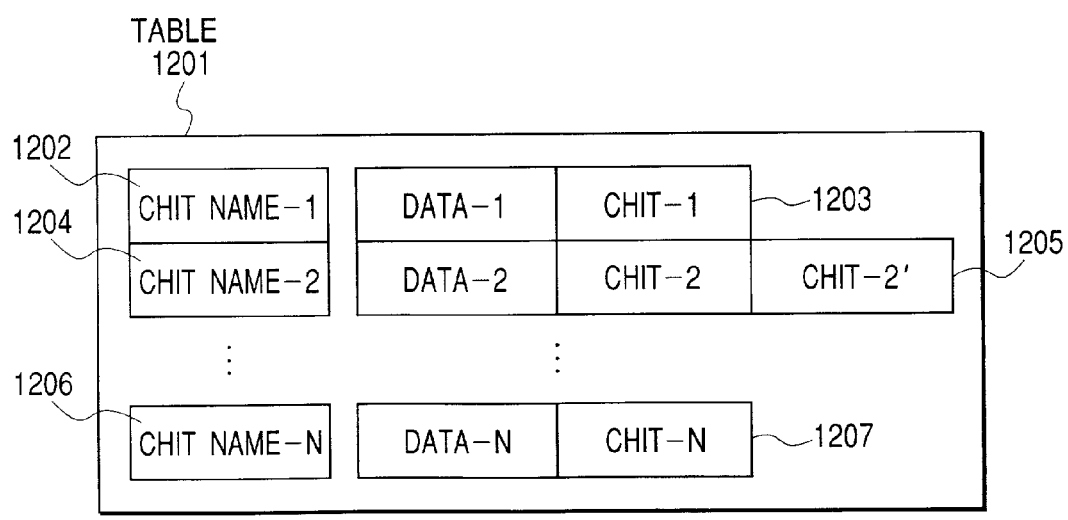
FIG. 12 is a table for the server to specify chit data and chit forms (chit templates) necessary for generation of image, based on chit names included in the HTTP request.

FIG. 12 shows a table for specifying the chit data and chit form (chit template) necessary for the generation of image, based on the chit name included in the HTTP request. Numeral 1201 denotes the table indicating combinations of chit data and chit forms corresponding to respective chit names. This table includes, for each chit, a name of the chit (1202, 1204, 1206), and chit data and a chit form corresponding thereto (1203, 1205, 1207). Numeral 1205 indicates the necessity for plural chit forms. The server 106 searches the table of FIG. 12 for the chit data and chit form, based on the chit name included in the HTTP request.

Figure 13:
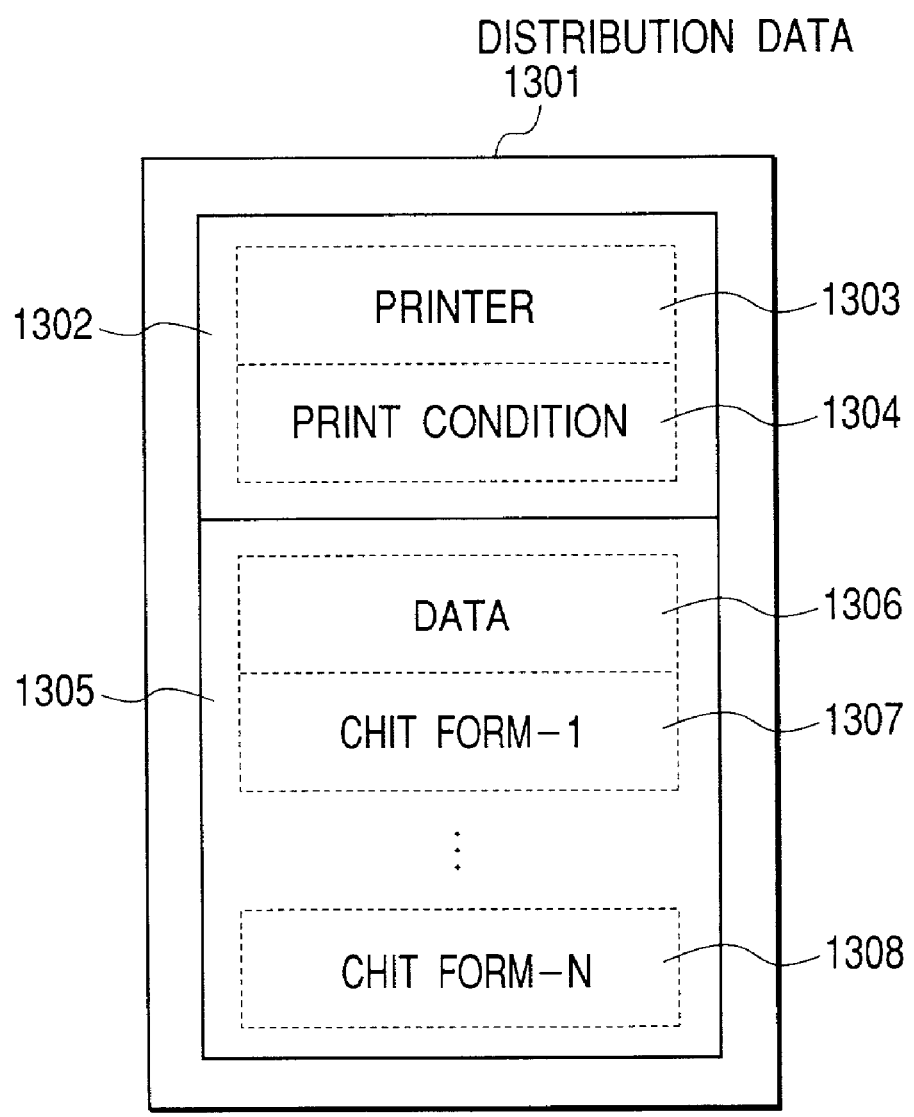
FIG. 13 is a diagram showing distribution data generated by the server.

FIG. 13 is a diagram showing the distribution data generated at the server 106. Numeral 1301 designates the whole of the distribution data delivered to the client 100.

Numeral 1302 designates a header part of the distribution data. Numeral 1303 denotes a field for storing the output printer information. Numeral 1304 represents a field for storing the information of the print condition.

Numeral 1305 stands for a data part of the distribution data. Numeral 1306 denotes a field for storing the data necessary for the generation of image. Numerals 1307 and 1308 represent fields for storing respective chit forms. Even in the case of a plurality of chit forms being present under a chit name, the data part 1305 is able to store the respective chit forms in succession.

<Processing at client 100 in client site making>

Figure 14:
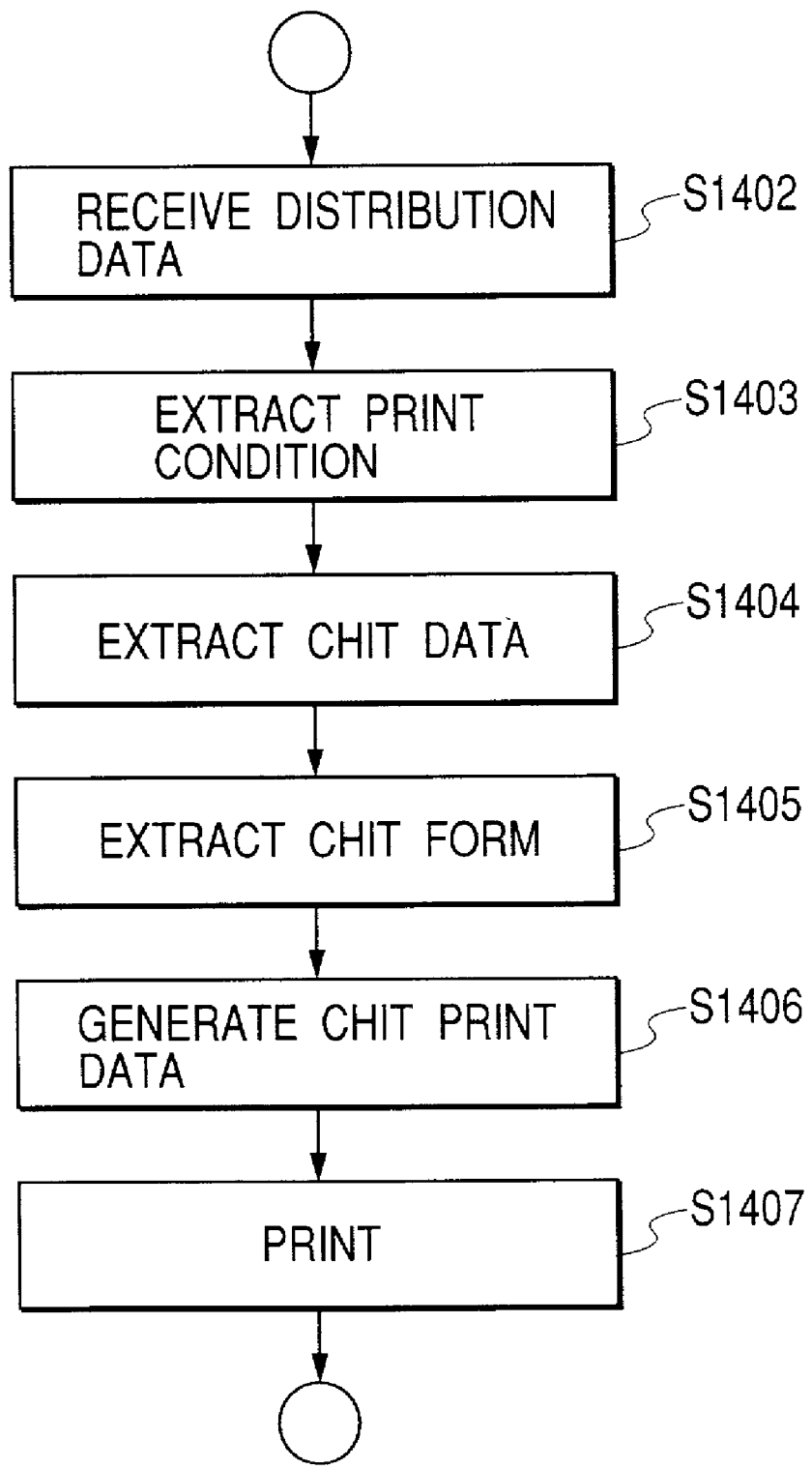
FIG. 14 is a flowchart of processing in which the client receiving the distribution data from the server, generates an image and prints it.

FIG. 14 is a flowchart of processing in which the client 100, receiving the distribution data from the server 106, generates an image and prints it. Step S1402 is executed by the data I/O unit 102, steps S1403, S1404 and S1405 by the data processor 902, step S1406 by the image generator 903, and step 1407 by the print output unit 103.

At step S1402, the data I/O unit 102 receives the distribution data generated at the server 106. At step S1403, the data processor 902 extracts the print condition from the distribution data received at step S1402 and saves it in the memory. At step S1404, the data processor 902 extracts the chit data necessary for the print of the chit and saves it as a file. At step S1405, the data processor 902 extracts the chit form necessary for the generation of image and saves it as a file.

At step S1406, the image generator 903 generates the chit print data, based on the information extracted at steps S1403, S1404 and S1405. A generating method of the chit print data at this time is equivalent to steps S602, S603, S604, S605 and S606 of FIG. 6. At next step S1407, the print output unit 103 makes the printer 104 execute the printing operation based on the chit print data.

<Automatic Distribution of Chit Form>

The following will describe an automatic distribution function of chit form. This function is such a function that the client 100 stores a chit form delivered from the server 106 and that the server 106 automatically delivers only a necessary chit form in reply to a second or later print request to avoid redundant distribution of the already-delivered chit form to the client 100, whereby the client 100 reuses the chit form already delivered and stored.

Figure 15:
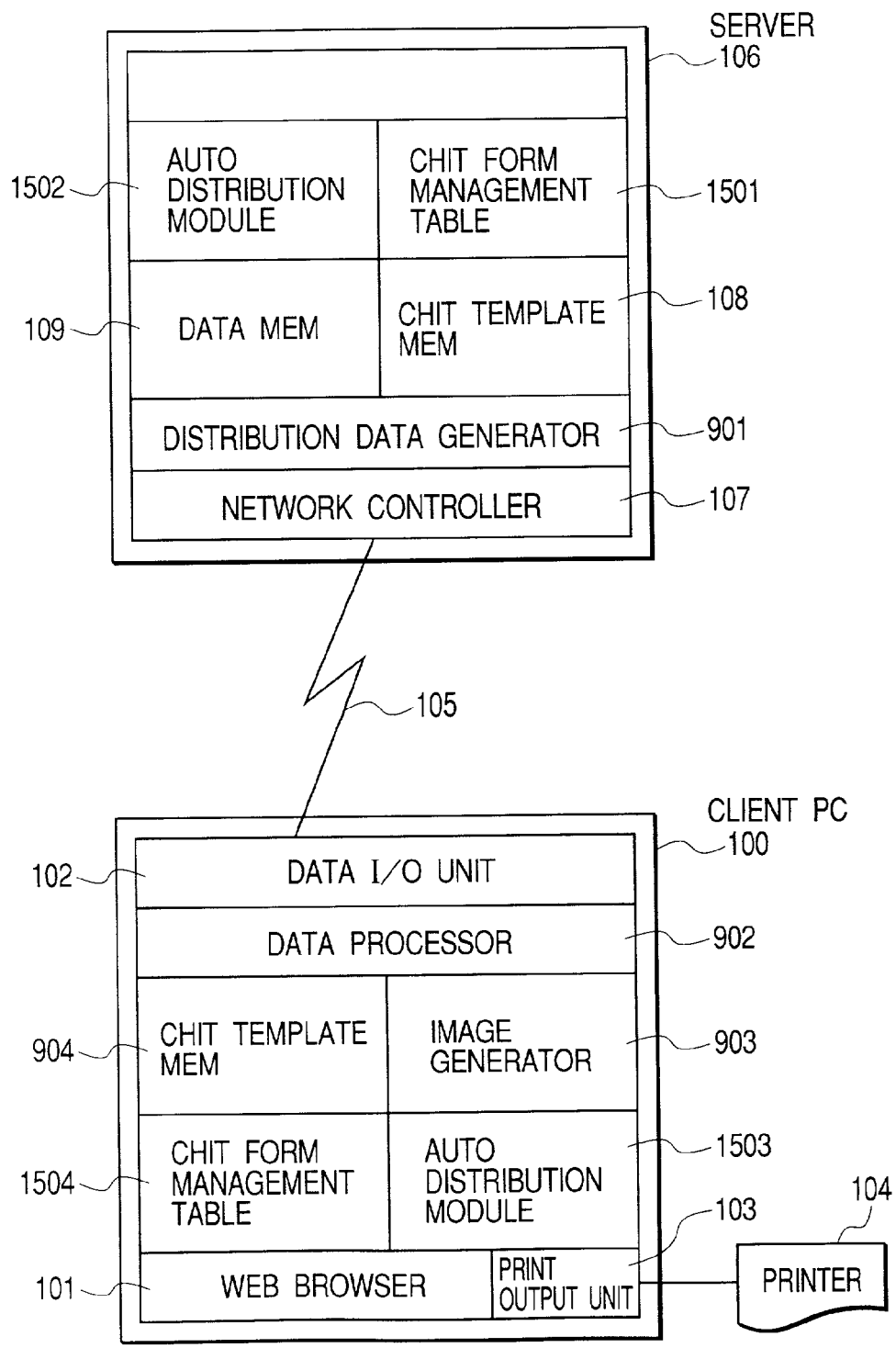
FIG. 15 is a functional block diagram of a chit print system capable of providing an automatic distribution function of chit form.

FIG. 15 is a functional block diagram of a chit print system capable of providing the automatic distribution function of chit form. In this print system, the server 106 has new elements of chit form management table 1501 and automatic distribution module 1502, the client 100 new elements of automatic distribution module 1503 and chit form management table 1504.

Reference is made to the chit form management table 1501 in order to control distribution of chit form. The chit form management table stores information about file names of chit forms stored at the server 106 and about last update times of generation and update of the files.

On the other hand, the chit form management table 1504 at the client 100 is also a similar management table and stores information about file names of chit forms stored at the client 100 and about last update times of generation and update of the files.

Figure 24:
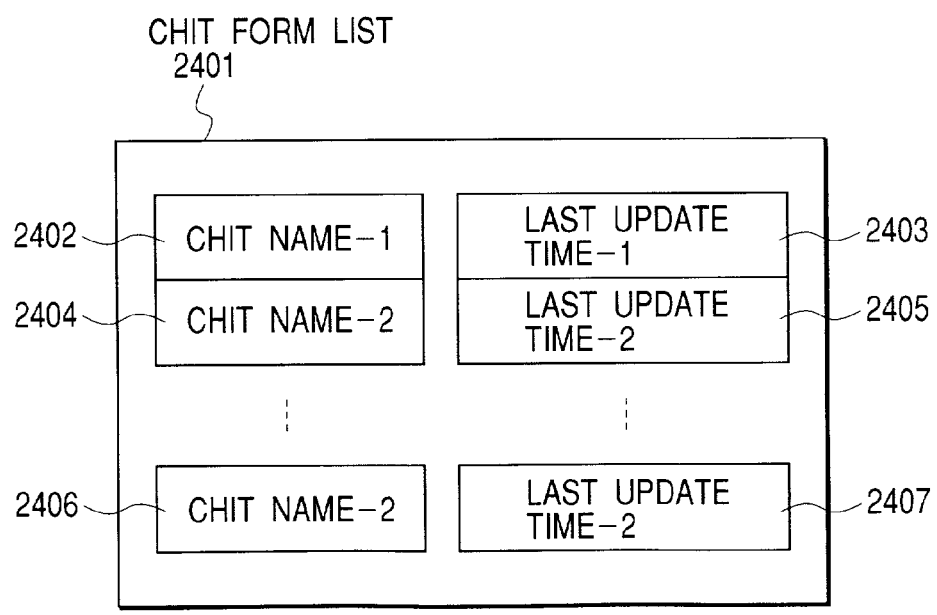
FIG. 24 is a diagram showing the contents of a chit form management table.

FIG. 24 is a diagram showing the contents of the chit form management tables. Numeral 2401 represents the whole of a management table. This table includes, for each chit, a chit name thereof 2402, 2404, 2406, and last update time information 2403, 2405, 2407 indicating a last update time of the chit. The information of this list can incorporate information about a plurality of chits.

This table is provided as a file both on the server 106 side and on the client 100 side. The system preliminarily provides the management table on the server 106 side, based on the chit forms stored on the server 106 side. In contrast to it, the management table on the client 100 side includes nothing immediately after activation of the system, is automatically generated at execution of processing at S2005, and thereafter is automatically updated at every execution of the processing at S2005. Using this management table, an image is always generated according to the latest chit form, without user's awareness.

The automatic distribution module is sent from the server 106 to the client 100, and the client 100 can use the automatic distribution function by executing the automatic distribution module.

Figure 16:
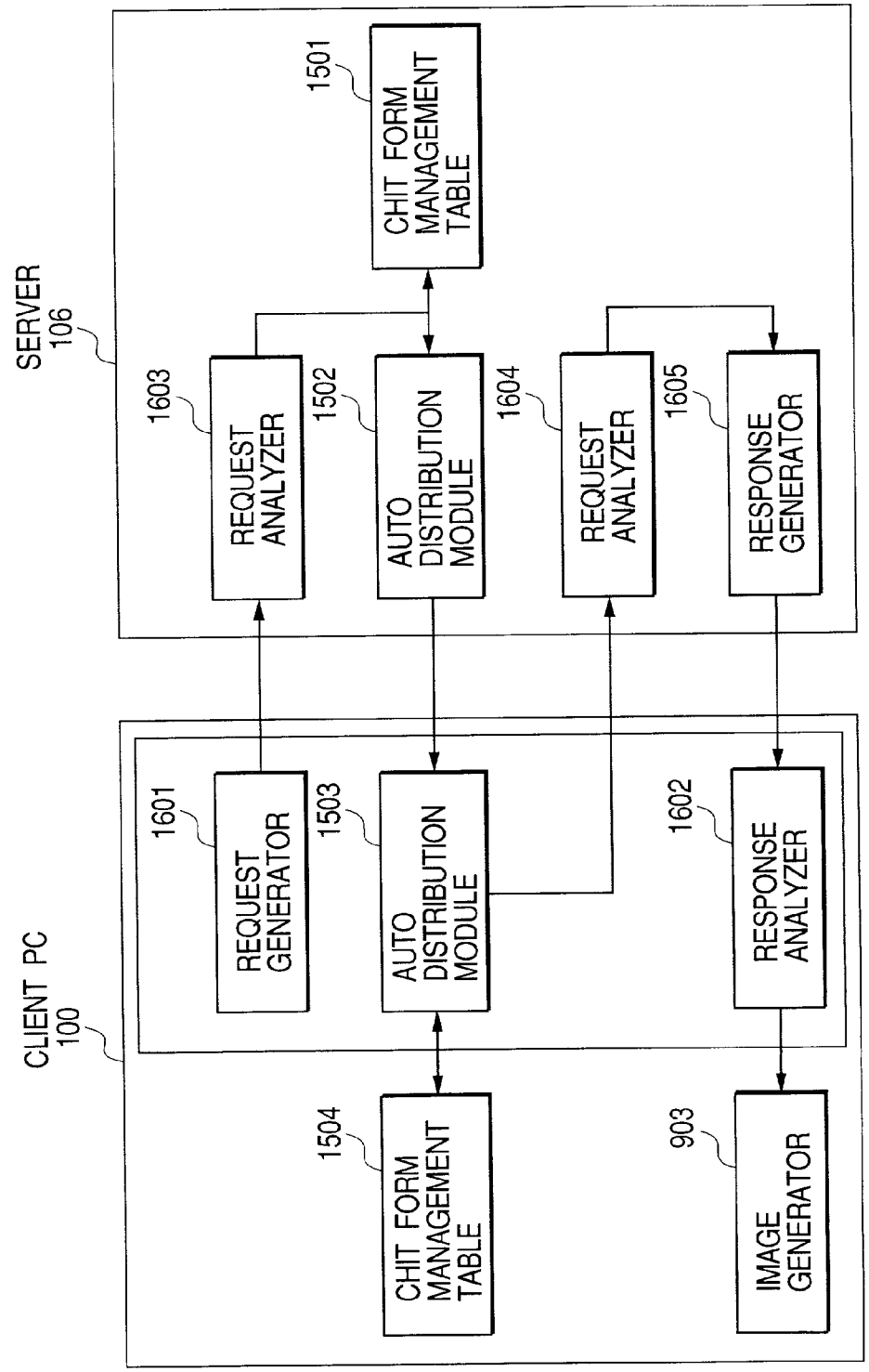
FIG. 16 is a diagram showing a schematic configuration of the automatic distribution function of chit form.

FIG. 16 is a diagram showing a schematic configuration of the automatic distribution function of chit form. New elements herein, request generator 1601 and response analyzer 1602, are assumed to be included in the data processor 902. Further, request analyzer 1603, request analyzer 1604 and response generator 1605 are assumed to be included in the distribution data generator 901.

<Processing 1 at server 106 in automatic distribution of chit form>

Figure 17:
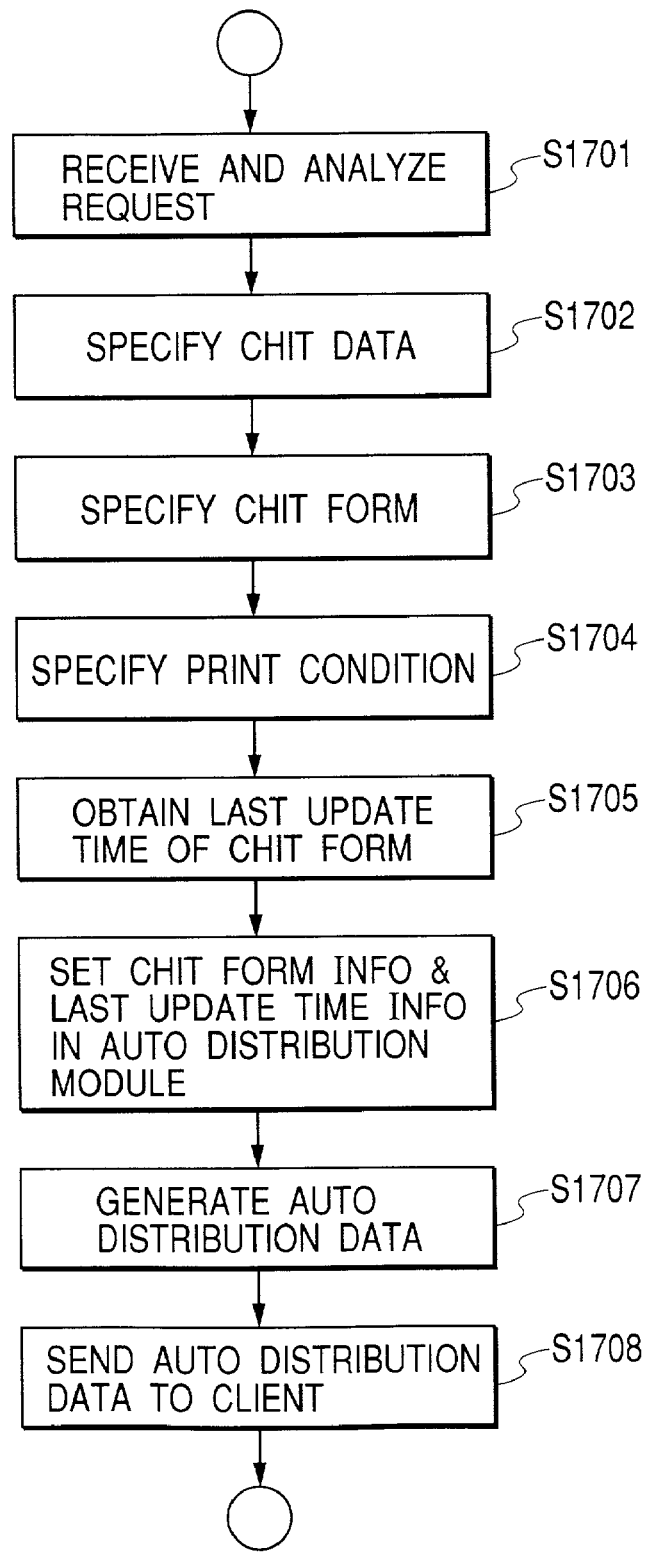
FIG. 17 is a flowchart of processing carried out when the server performs the automatic distribution of chit form.

FIG. 17 is a flowchart of processing carried out when the server 106 executes the automatic distribution of chit form. This is processing executed by the request analyzer 1603 of FIG. 16.

At first step S1701, the request analyzer 1603 analyzes a request (HTTP request) received from the Web browser 101. At steps S1702 and S1703, the request analyzer 1603 specifies data necessary for generation of chit print data requested by the client 100; particularly, a chit form and chit data. Further, at step S1704, the request analyzer 1603 specifies printer information, the number of prints, etc. (which will be called together a print condition) for execution of print by the printer after generation of an image at the client 100.

At step S1705, the request analyzer 1603 acquires the last update time information of each chit form specified at step S1703, with reference to the chit form management table 1501 managing the chit forms stored at the server 106.

At step S1706, the request analyzer 1603 sets the information indicating the chit form specified at step S1703 and the last update time information acquired at step S1705, in the automatic distribution module 1502. Then the request analyzer 1603 generates the automatic distribution data including the automatic distribution module at step S1707. At step S1708, the automatic distribution data thus generated, is sent to the client 100.

Figure 22:
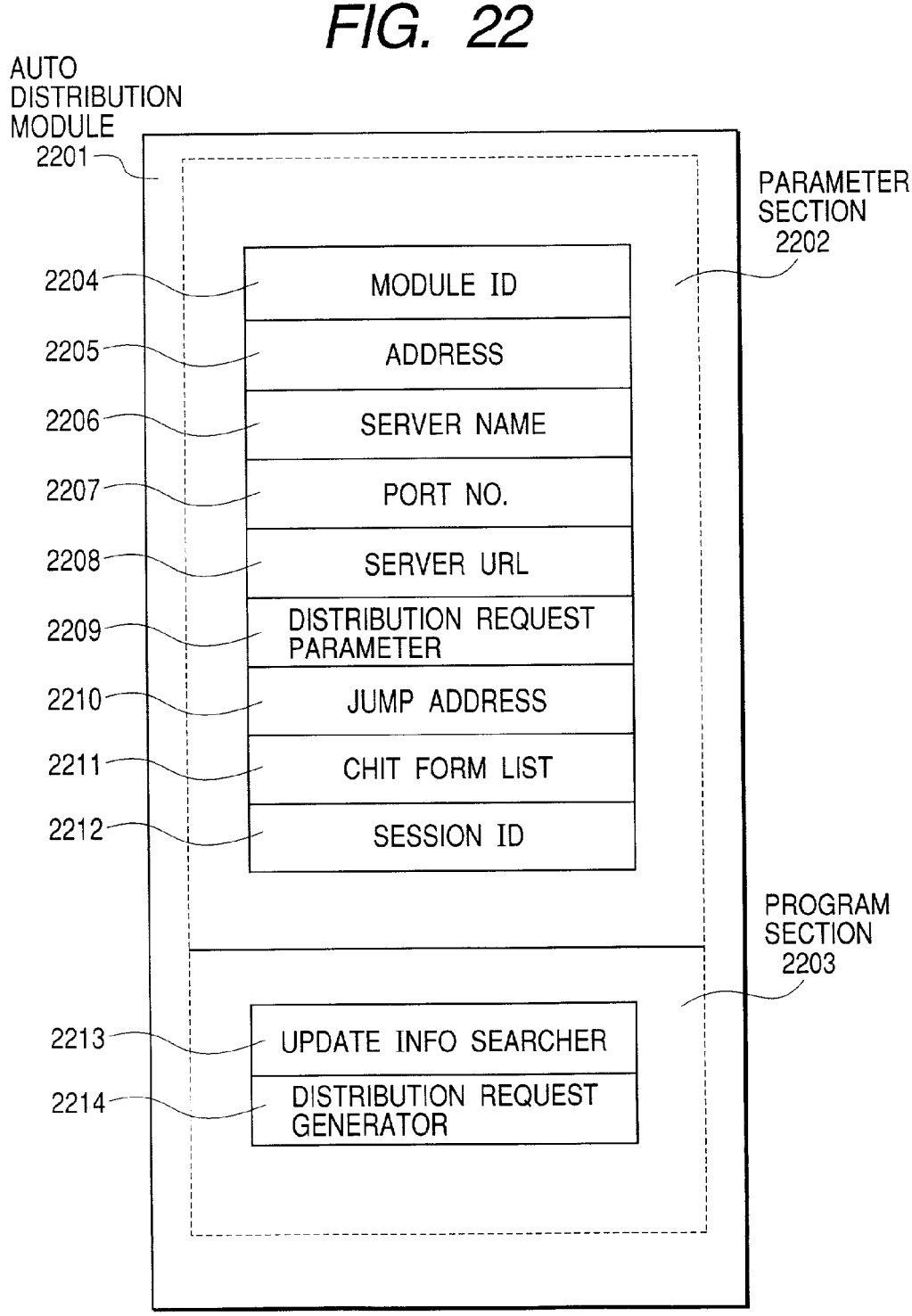
FIG. 22 is a diagram showing the contents of an automatic distribution module.

FIG. 22 is a diagram showing the contents of the automatic distribution module. Numeral 2201 designates the whole of the automatic distribution module, which is composed of parameter section 2202 and program section 2203. Numeral 2204 represents an ID for specifying the module itself. Numeral 2205 indicates an address used upon transmission of the module from the server 106 to the client 100. Numeral 2206 denotes a name of the server 106. Numeral 2207 represents a port number utilized in communication between the server 106 and the client 100. Numeral 2208 denotes a URL specifying the server 106 under the Web environment. Numeral 2209 represents a parameter necessary for generation of a distribution request at S1807. Numeral 2210 represents a URL indicating a home page displayed on the browser on the client 100 side after completion of the automatic distribution processing. Numeral 2211 represents information of a chit form list as an object of automatic distribution. Numeral 2212 indicates a session ID necessary for execution of sessions while retaining information under the Web environment. Numeral 2213 represents a program code for specifying a chit form to be distributed, out of the chit forms included in the list 2211. Numeral 2214 represents a program code for generation of a distribution request to the server 106 at S1807.

Receiving a print request including the automatic distribution processing from the client 100 at S1701, the server 106 sets necessary values in the parameter group of the section 2202 and sends this automatic distribution module to the client 100. Receiving the automatic distribution module at step S1801 in FIG. 18, the client 100 executes the program codes of the section 2203 while referencing to the parameters of the section 2202 (which will be detailed hereinafter).

Figure 23:
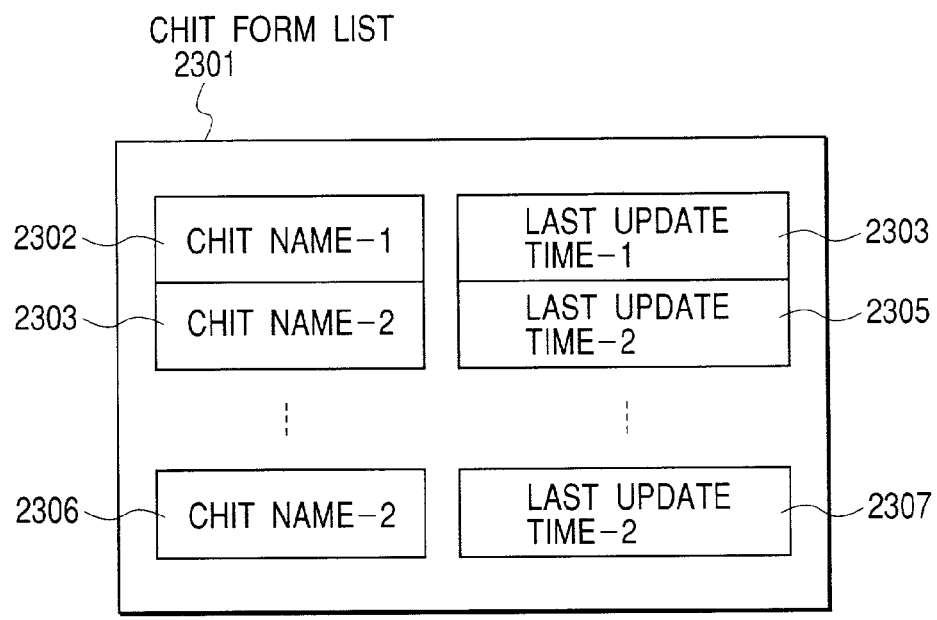
FIG. 23 is a diagram showing the contents of chit form list information retained in the automatic distribution module.

FIG. 23 shows the contents of the chit form list information denoted by 2211, which is retained in the automatic distribution module. Numeral 2301 represents the whole of the list information. This list information includes, for each chit, a chit name thereof 2302, 2304, 2306, and last update time information 2303, 2305, 2307 indicating a last update time of the chit. This list information can incorporate information about a plurality of chits.

<Processing 1 at Client 100 in Automatic Distribution of Chit Form>

Figure 18:
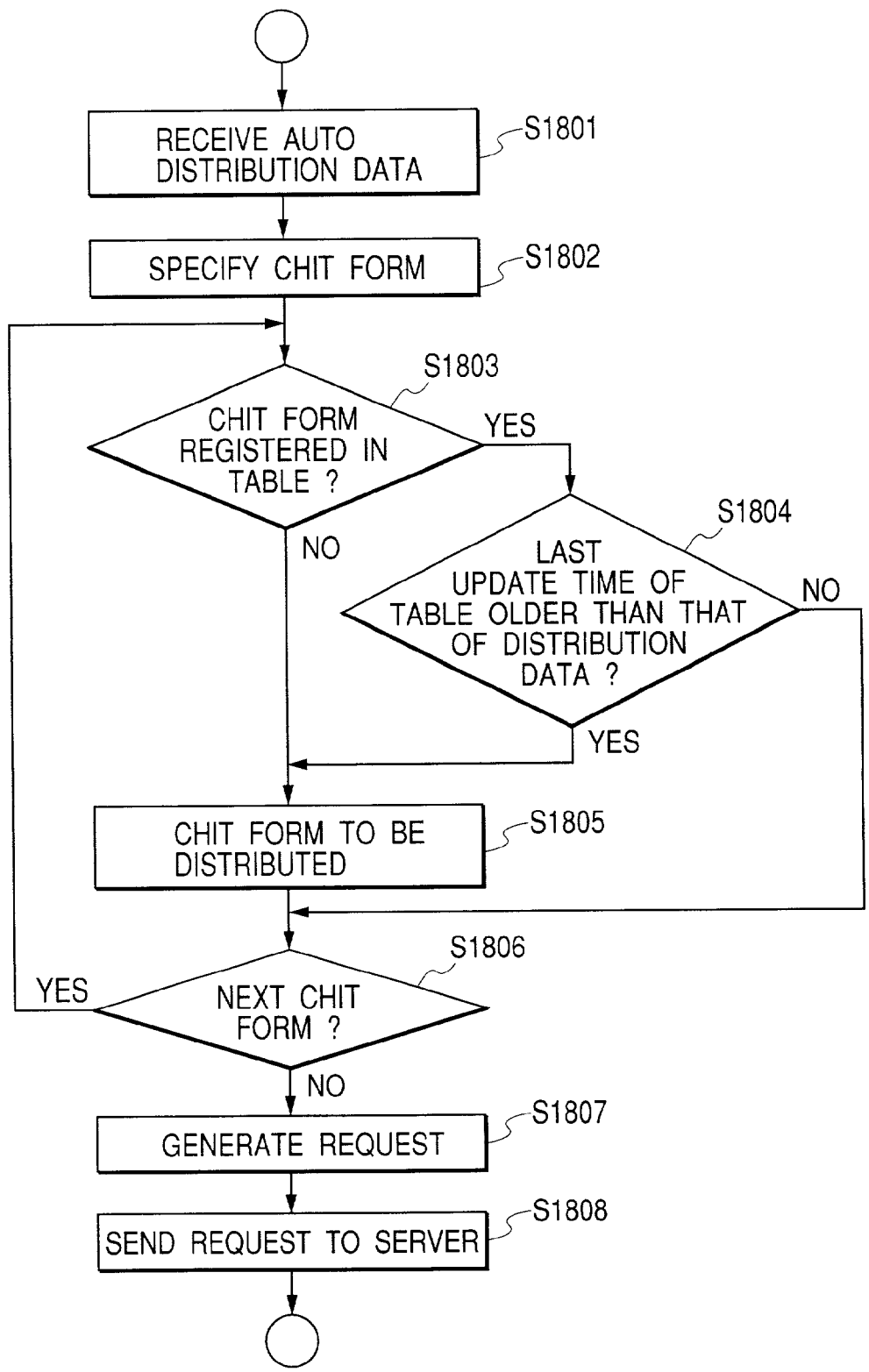
FIG. 18 is a flowchart of processing carried out when the client receives the automatic distribution data.

FIG. 18 is a flowchart of processing carried out when the client 100 receives the automatic distribution data. This processing is executed by the automatic distribution unit 1503.

At first step S1801, the automatic distribution unit 1503 receives the automatic distribution data and executes the automatic distribution module included therein to carry out the following steps. At step S1802, the automatic distribution unit extracts the information indicating the chit form, from the automatic distribution data. At next step S1803, the automatic distribution unit determines whether the chit form indicated by the information extracted at step S1802, is registered in the chit form management table, thereby checking whether the chit form has already been distributed. Unless it is registered, the unit 1503 proceeds to step S1805 to save the chit form as one to be distributed.

When the chit form management table includes the chit form, the unit 1503 goes to step S1804 to compare the last update time information of the chit form included in the automatic distribution data with that in the chit form management table, thereby determining whether the last update time of the chit form indicated by the last update time information in the chit form management table is older than that in the automatic distribution data. When the information in the table is not older, the unit proceeds to step S1806 on the basis of the judgment that there is no need for distribution of new information. When it is older, the unit goes to step S1805 in order to request distribution of new information of the chit form.

At step S1806, the unit determines whether there is another chit form. When there is, the unit executes the processing at and after step S1803 for the next chit form. When there is no other chit form, the unit moves to step S1807 to generate a request (HTTP request) for distribution of the chit form saved at step S1805. Then the unit 1503 sends the request to the server 106 at step S1808.

<Processing 2 at Server 106 in Automatic Distribution of Chit Form>

Figure 19:
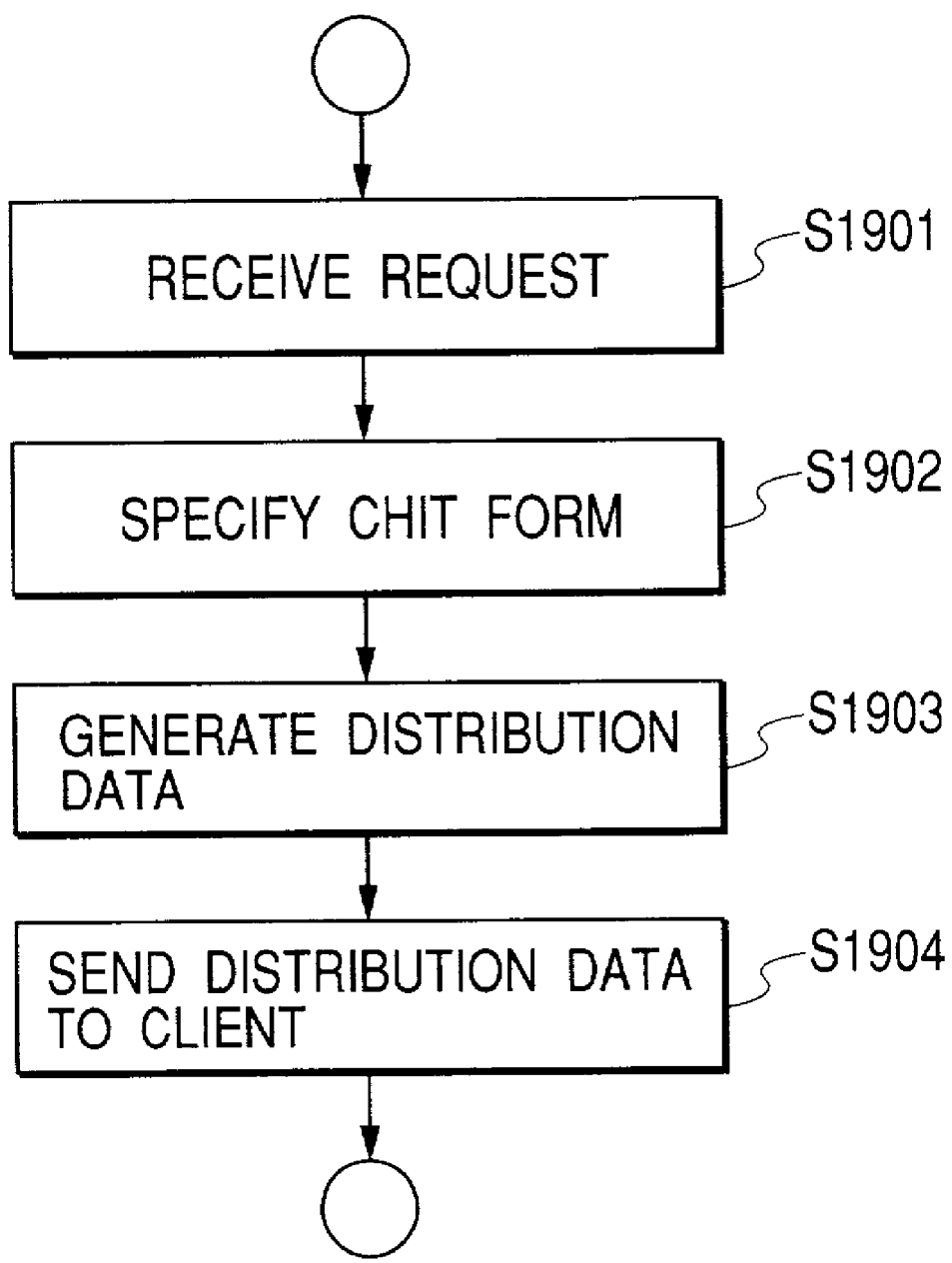
FIG. 19 is a flowchart of processing carried out when the server receives the request for delivery of a chit form, which was sent at step S1808 by the client.

FIG. 19 is a flowchart of processing carried out when the server 106 receives the request for distribution of the chit form, which was sent from the client 100 at step S1808. This processing is executed by the units 1604 and 1605 of FIG. 16.

At first step S1901, the request analyzer 1604 receives the request for distribution of the chit form from the client 100. At next step S1902, the request analyzer 1604 analyzes the request thus received, to specify the chit form to be distributed to the client 100, i.e., the chit form absent at the client 100.

At step S1903, the response generator 1605 synthesizes one data from the chit form specified at step S1902, the chit data specified at step S1702, and the information indicating the print condition specified at step S1704, to generate the distribution data as shown in FIG. 13. At step S1904, the response generator 1605 sends the distribution data to the client 100.

<Processing 2 at Client 100 in Automatic Distribution of Chit Form>

Figure 20:
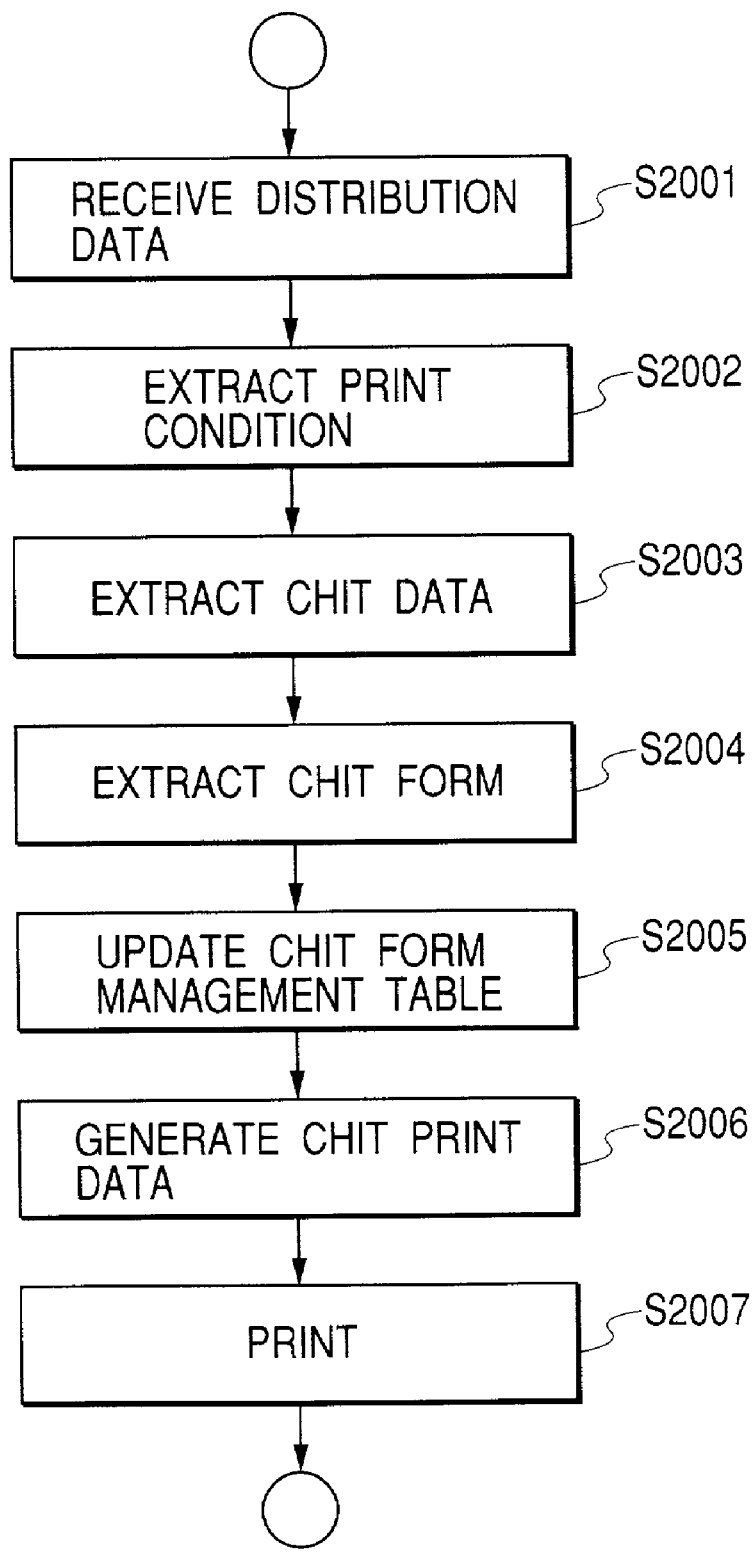
FIG. 20 is a flowchart of processing carried out when the client receives the distribution data generated by the server.

FIG. 20 is a flowchart of processing carried out when the client 100 receives the distribution data generated at the server 106. This processing is executed by the response analyzer 1602 and the image generator 903 of FIG. 16.

At step S2001, the response analyzer 1602 receives the distribution data generated at the server 106. At step S2002 the analyzer 1602 extracts the print condition from the distribution data received at step S2001 and stores it in the memory, and at step S2003 the analyzer extracts the chit data necessary for print of the chit and stores it as a file. At step S2004, the analyzer 1602 extracts the chit form necessary for generation of an image and stores it as a file.

At step S2005, the analyzer registers the distributed chit form and the last update time information of the chit form in the chit form management table. At next step S2006, the image generator 903 generates the chit print data, based on the information extracted at steps S2002, S2003 and S2004. A generating method of the chit print data at this time is equivalent to steps S602, S603, S604, S605 and S606 of FIG. 6. At next step S2007, the printer is made to print the image, based on the chit print data.

The automatic distribution function of chit form described above decreases the size of distribution data from the server 106, and thus reduces the load on the network. This effect becomes maximum when all the chit forms necessary for generation of images have been distributed to the client 100.

FIG. 21 is a table of comparison among sizes of distribution data from the server 106 on the basis of five types of sample chits. Numeral 2101 designates the sample chits. Numeral 2102 denotes the size of each distribution data with the entire chit form necessary for generation of an image, distributed from the server 106 without use of the automatic distribution. The unit is kByte. Numeral 2103 represents the size of each distribution data from the server 106 in the distribution using the automatic distribution function, by which the entire form necessary for generation of an image has already been distributed to the client 100. The unit is kByte. Numeral 2104 stands for a ratio of each distribution data size 2103 to the distribution data size 2102 on a percentage basis. It is seen from FIG. 21 that the automatic distribution function of chit form greatly contributes to decrease of distribution data.

<Selection between fixed distribution and automatic distribution>

The chit print system has a function for permitting the user to select either of distribution of the whole chit form necessary for the generation of image to the client 100 (hereinafter referred to as fixed distribution) and distribution of only the chit form absent at the client 100 (hereinafter referred to as auto distribution) and for inserting information about the selection in a print request generated.

Figure 25:
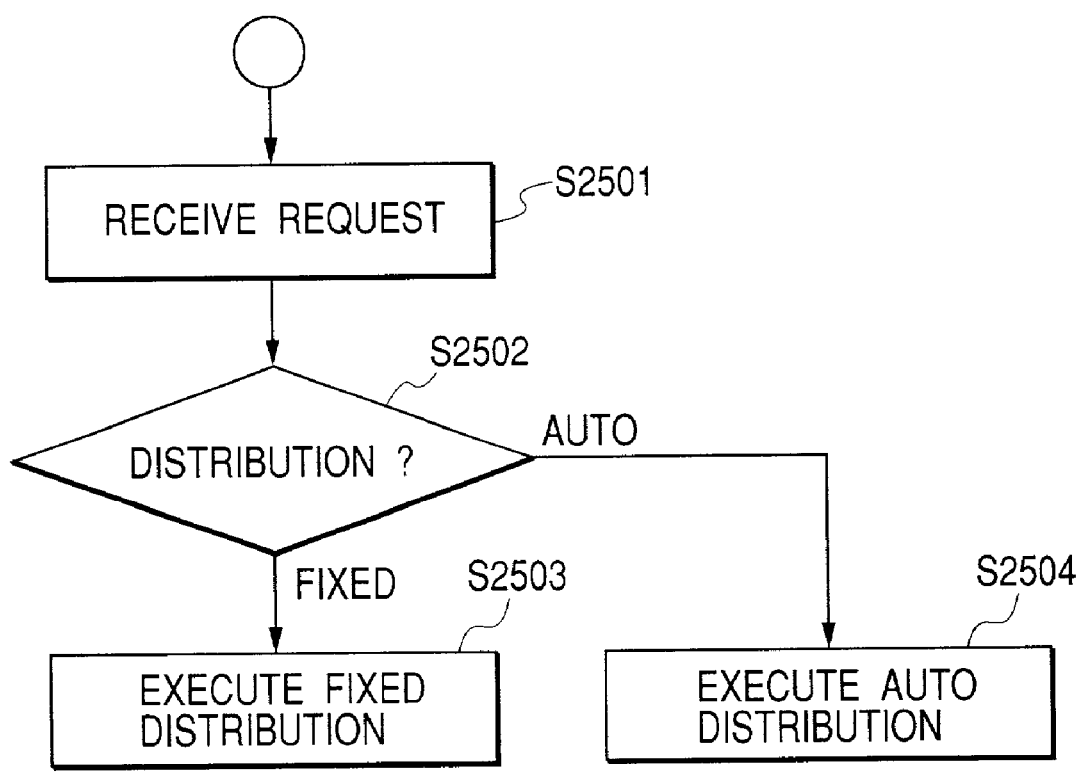
FIG. 25 is a chart of processing carried out when the server receives a request including selection of either fixed distribution or automatic distribution.

FIG. 25 is a chart of processing carried out when the server 106 receives the request including the selection of either the fixed distribution or the auto distribution. At first step S2501, the server receives the request. At next step S2502, the server analyzes a character string indicating a distribution mode included in the received request to determine which is to be executed between the fixed distribution processing and the auto distribution processing. When the auto distribution is requested, the processing in FIGS. 17 and 19 is executed at step S2504. When the fixed distribution is requested, the processing equivalent to steps S1701, S1702, S1703 and S1704 of FIG. 17 is executed at step S2503, and thereafter the processing equivalent to step S1903 is executed to generate the distribution data with the entire chit form. Then the distribution data is sent to the client 100.

<Selection of Image Generation>

Figure 26:
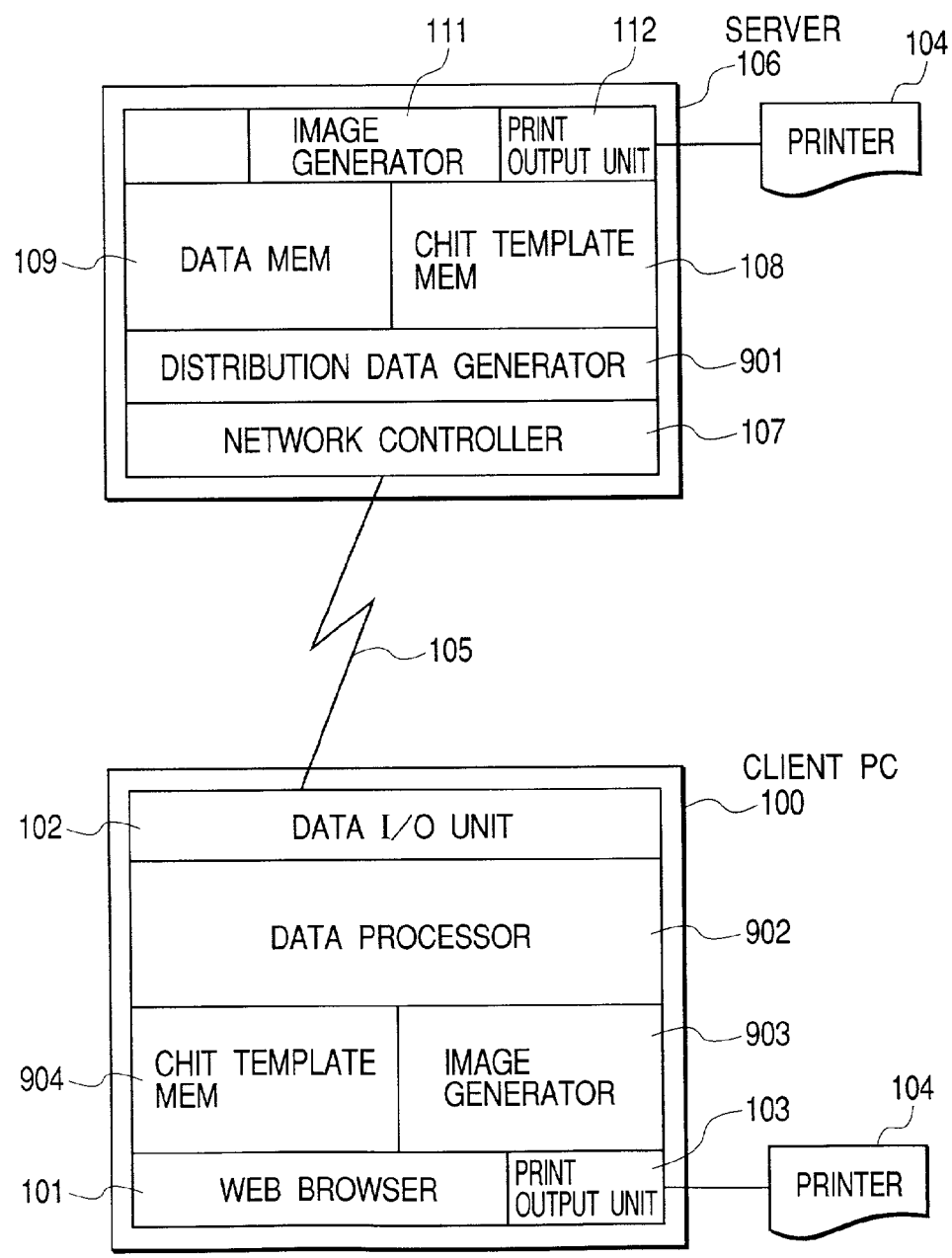
FIG. 26 is a functional block diagram of a chit print system permitting the user to select either generation of chit print data at the server or that at the client.

FIG. 26 is a functional block diagram of a chit print system that permits the user to select a site for generation of the chit print data, either the server 106 or the client 100. The components herein are those described in FIGS. 1 and 9. In this print system, when the user desires to generate the chit print data at the client 100, the chit print data is generated on the client 100 side, using the client site making function. When the user desires to generate the chit print data at the server 106, the chit print data is generated on the server 106 side, using the processing in FIGS. 7 and 8.

Figure 27:
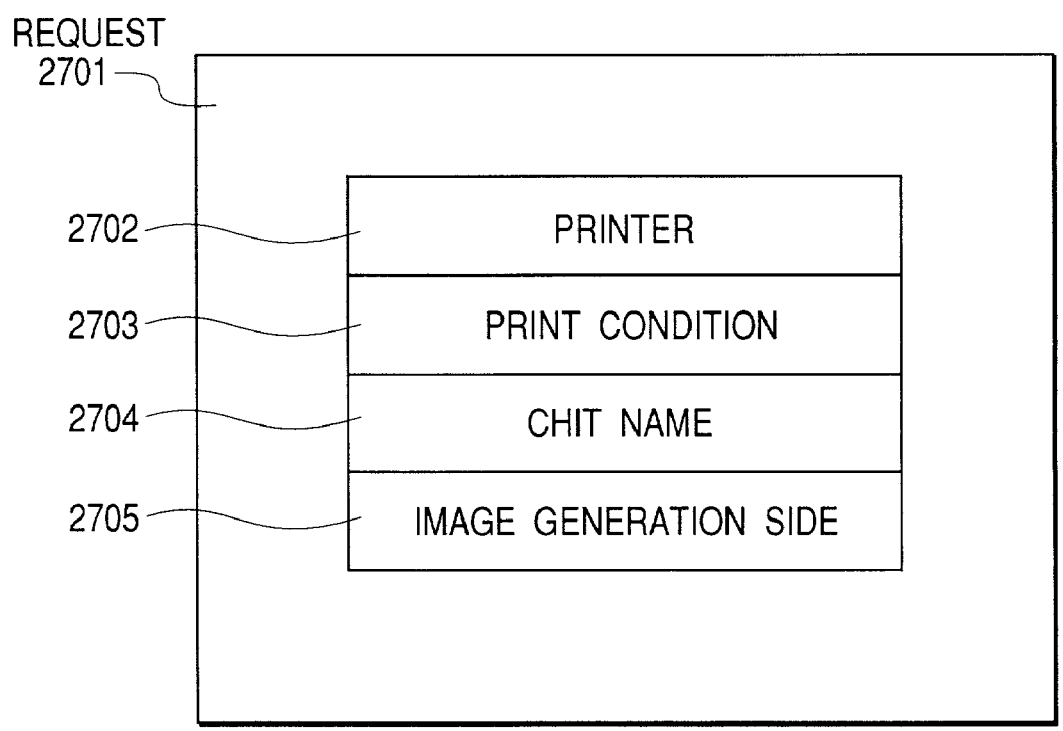
FIG. 27 is a diagram showing information included in a print request from the client capable of selecting a location for generation of image.

FIG. 27 is a diagram showing information included in a print request from the client 100 permitting selection of the site for generation of image. Numeral 2705 denotes a parameter to designate the site of execution for generation of image, which is set according to user's determination at the issue of the print request.

As described above, the present invention enables the chit print system to perform such operation that the server 106 delivers the data necessary for generation of the chit print data by overlay processing, to the client 100 and that the overlay processing is executed on the client 100 side to generate the chit print data. The volume of data flowing on the network can be efficiently reduced by implementing the function of permitting the client 100 to store the data distributed from the server 106 and avoiding redundant distribution of the data once stored at the client 100, from the server 106.

Figure 35:
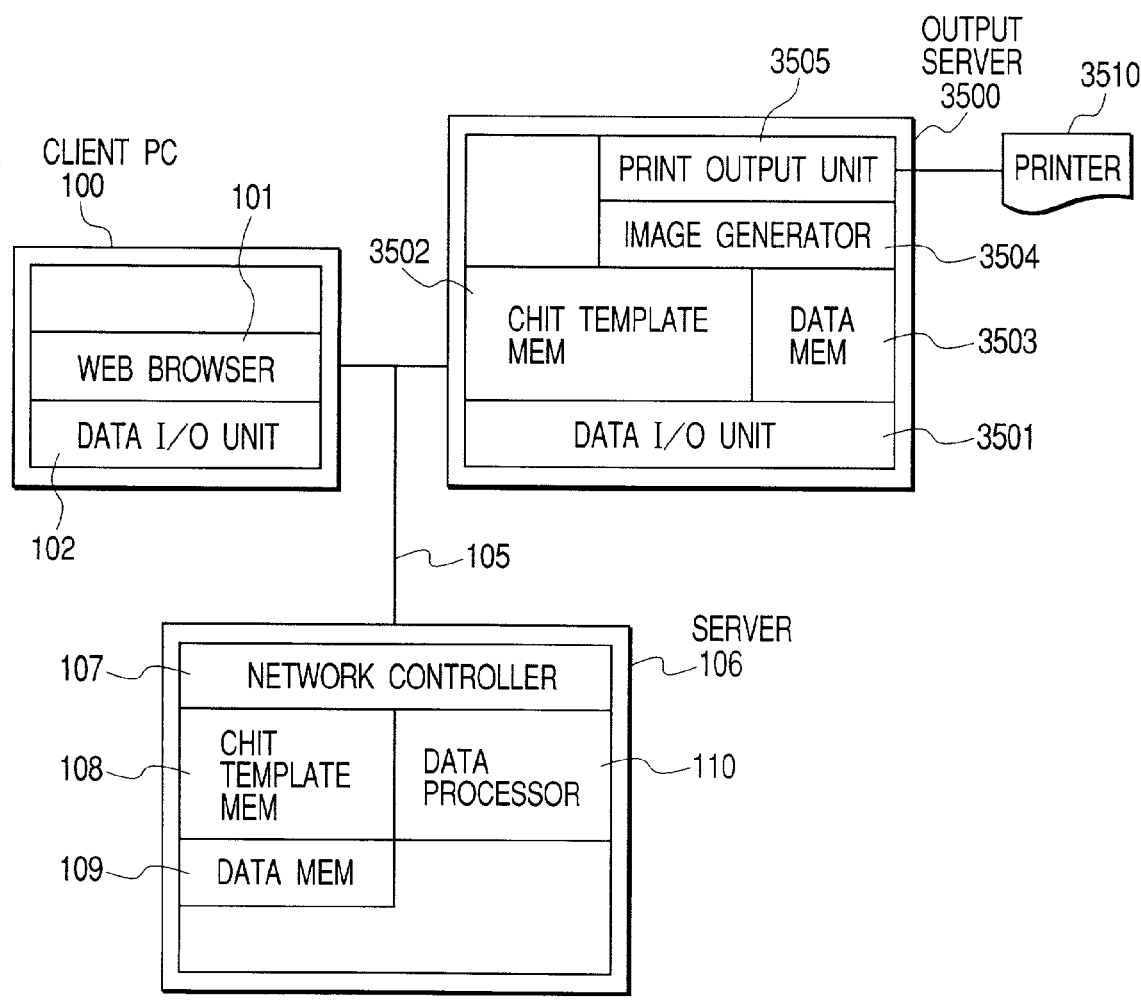
FIG. 35 is a functional block diagram of a chit print system capable of providing an output server making function.

FIG. 35 is a functional block diagram of a chit print system capable of providing an output server making function. This print system is provided with a new unit of output server 3500. The output server has data I/O unit 3501, chit template memory 3502, data memory 3503, image generator 3504, and print output unit 3505. The other functional structure is substantially the same as in FIG. 1.

The data I/O unit 3501 receives or delivers data from or to the server. The chit template memory 3502 stores a chit template for print of a chit. The data memory 3503 stores the data for printing of chit. The image generator 3504 generates the chit print data according to a predetermined format. The print output unit 3505 is a unit for converting the data generated at the image generator 3504, to a printer-digestible form, which is generally called a printer driver. Numeral 3510 denotes a printing device such as a printer or the like.

Figure 36:
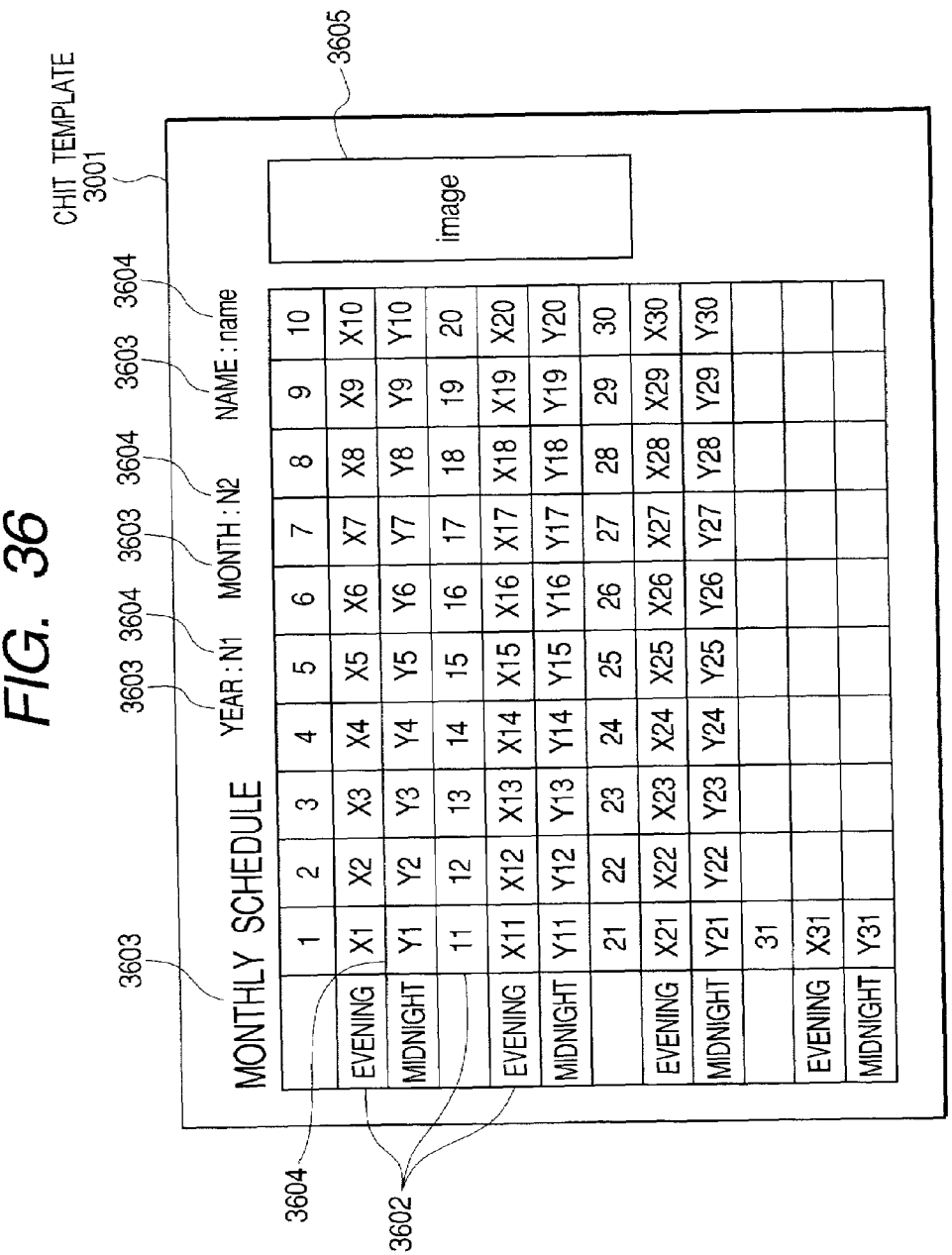
FIG. 36 is a view of a chit template.

FIG. 36 is a diagram showing a chit template. The chit template described herein is a little different from that of FIG. 4.

Numeral 3001 represents an area indicating the entire chit template, which is normally equivalent to a page of a sheet for print. Such chit templates are stored in the chit template memory 108. Which chit template is to be used among those is determined in conjunction with selection of a table.

In FIG. 36, the graphic data on the chit template is categorized into fixed graphic data and variable data (chit data). The fixed data includes frame lines indicated by 3602, numerals indicating days and others, and character strings indicated by 3603, and is always the same graphics when printed.

The variable data includes data at locations indicated by N1, N2, name, X1, Y1, etc. denoted by 3604. The variable data is provided with respective names N1, N2, name, X1, Y1, and so on (which will be referred to hereinafter as indices of the variable data), and each of their locations is filled with a data value retrieved from the data memory 109 or a data value acquired by processing at the data processor 110.

An area indicated by 3605 is tagged with "image," which means that image data is embedded in that area.

Figure 37:
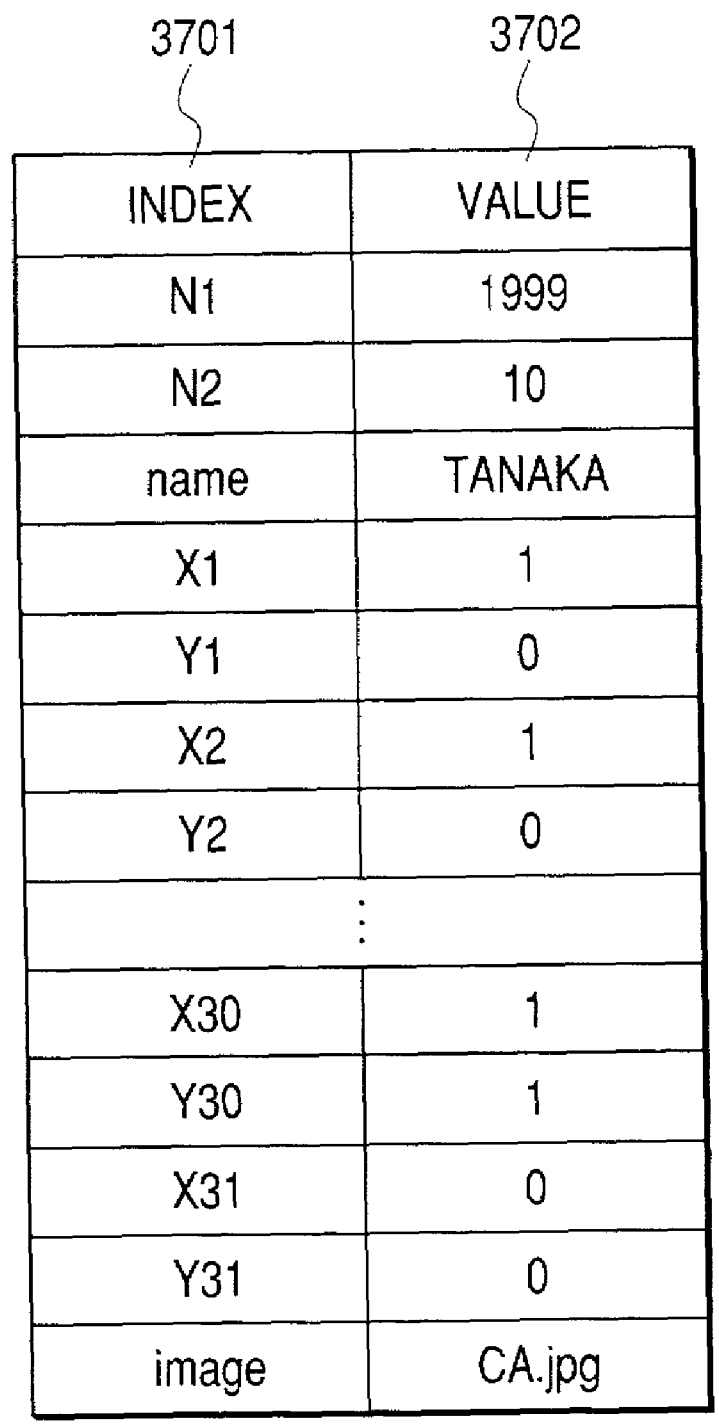
FIG. 37 is a diagram showing a table including indices of variable data to be inserted, and data values thereof.

FIG. 37 is a diagram of a table including the indices and data values of the variable data embedded. This table includes, for each variable data, a name (index) thereof 3701 on the chit template 3001, and a data value 3702 embedded at a location corresponding to the variable data on the chit template 3001. The data processor 110 generates the sets shown in FIG. 37 while referencing to a database or the like for processing of business task.

The data processor generates the chit print data by merging the graphic data shown in the chit template of FIG. 36 with the data values corresponding to the respective indices with reference to the table of FIG. 37. FIG. 37 shows that image data searchable under a name of CA.jpg is used in the generation of this chit image.

FIG. 38 shows the chit print data where the variable data of FIG. 37 is embedded in the chit template of FIG. 36.

FIG. 39 is a diagram showing an example of data sent from the server 106 to the output server 3500. The left data A is data transferred when the image data searchable under the name of CA.jpg is actually found on the server 106. The data is accompanied by all the contents of the chit template data and image data. The right data B is data transferred when the image data searchable under the name of CA.jpg is not found on the server 106. The data is not accompanied by the contents of the image data, but by only the chit template data.

<Processing at Server in Output Server Making>

Figure 40:
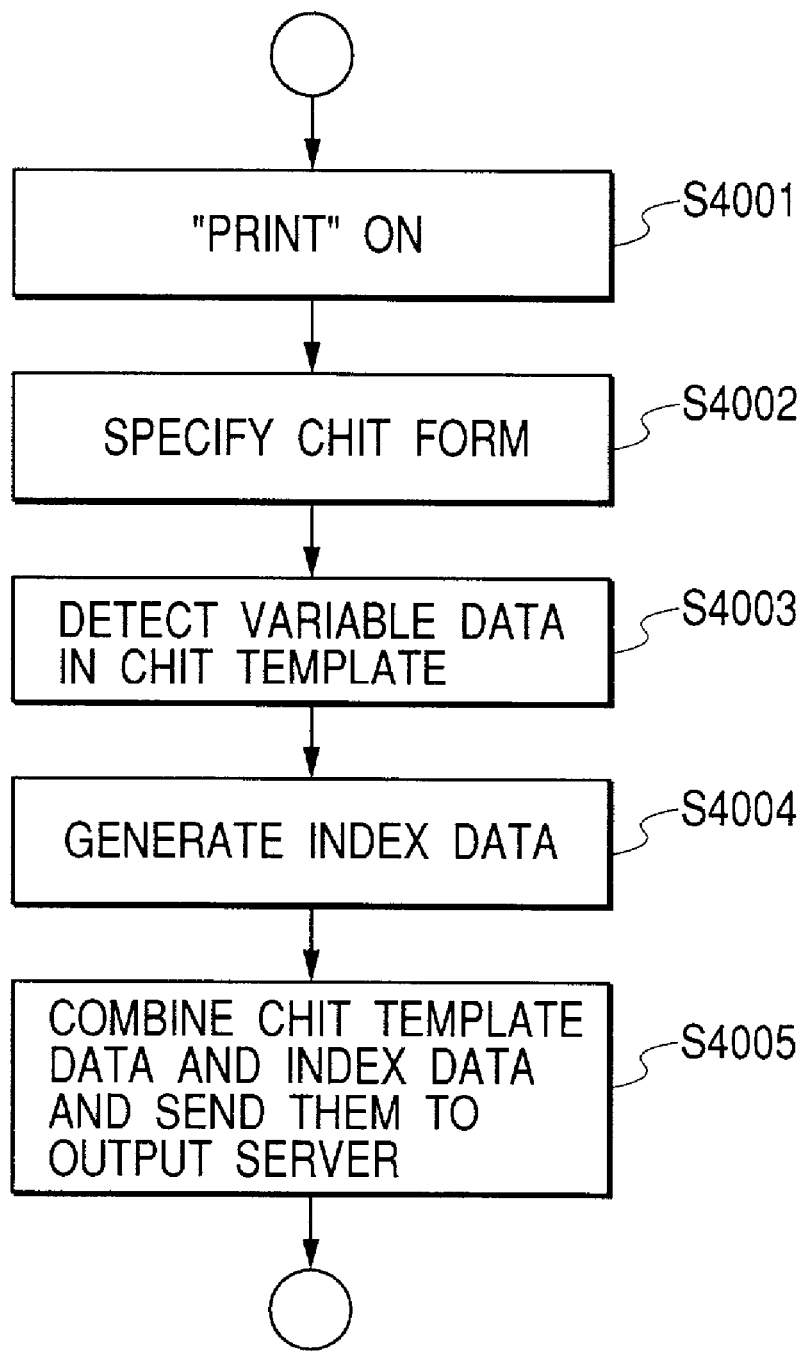
FIG. 40 is a flowchart of processing in which the server receiving a print request from the client, generates data to be transferred to the output server, and sends it to the output server.

FIG. 40 is a flowchart of processing in which the server receiving a print request from the client generates data to be transferred to the output server and then sends it to the output server. This flowchart is executed when the print button 210 of FIG. 2 is pressed down.

At first step S4001, the server receives a notification of the press of the print button. Then the server analyzes the request (HTTP request) received from the Web browser 101. At next step S4002, the server determines which chit is necessary for generation of the chit print data requested by the client, to specify a chit form of the chit.

At step S4003, the server then searches for the chit template data and retrieves it to recognize a pattern of the variable data. Further, at step S4004, the server extracts the indices and data values with reference to the table of FIG. 37 and attaches the data values to the indices to generate the index data.

At next step S4005, the server combines the index data generated at step S4004 with the chit template data to generate data like the data B of FIG. 39, and then sends it to the output server. In another case where the server succeeded in retrieving the image data, the server also adds the image data to generate data like the data A of FIG. 39, and sends it to the output server.

<Processing at Output Server in Output Server Making>

Figure 41:
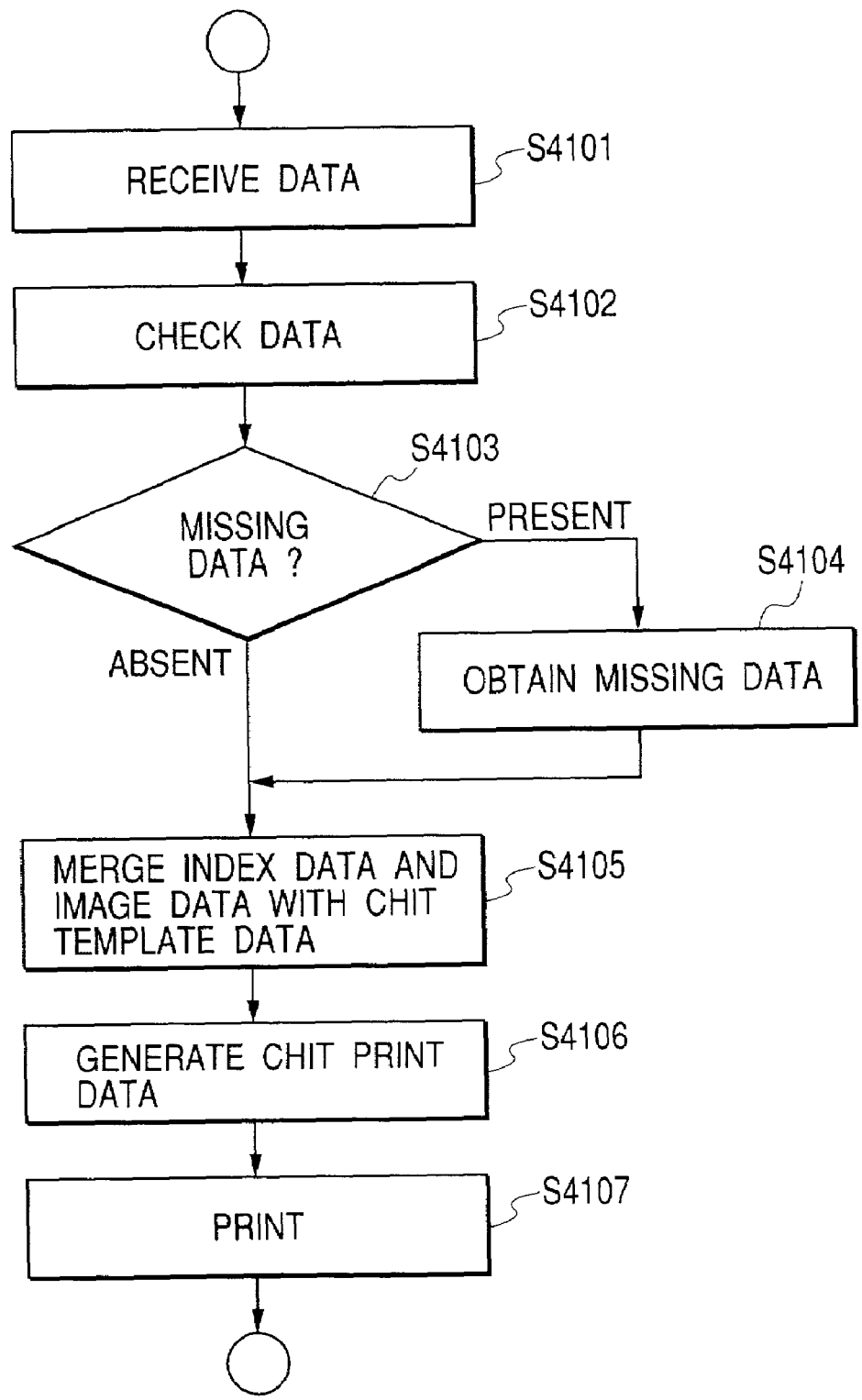
FIG. 41 is a flowchart of processing in which the output server receiving data from the server, generates chit print data and makes a printer print it.

FIG. 41 is a flowchart of processing in which the output server receiving the data from the server generates the chit print data and makes the printer print it.

At step S4101, the output server receives the data from the server and extracts the index data and chit template data from the data. At next step S4102, the output server checks the contents of the data thus extracted, to determine whether there is missing data in the data from the server.

When the result of the check at step S4102 is YES at step S4103, i.e., when missing data is present, the output server searches for the missing data at step S4104 to obtain the missing data. For example, when the output server receives the data like the data B of FIG. 39 from the server, the output server judges that the image data named CA.jpg is missing, and searches for the data, using the name of CA.jpg, at step S4104.

At step S4105 the output server inserts the index data and the image data found by the search, into the chit template, and at step S4106 the output server generates final chit print data. At step S4107, the output server converts the chit print data to data suitable for the printer, and outputs the data after the conversion to the printer.

Figure 42:
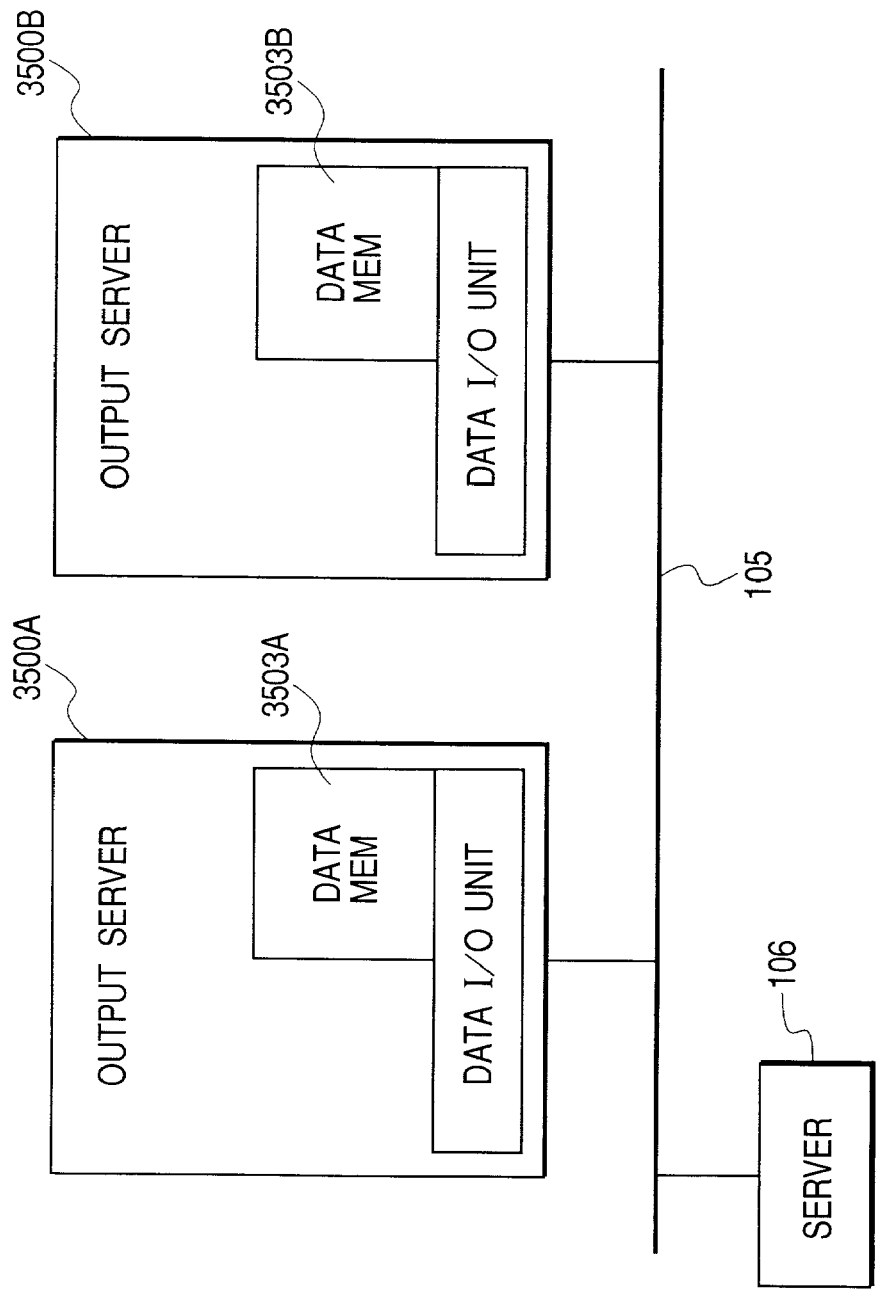
FIG. 42 is a diagram showing an example of a configuration provided with two output servers.

FIG. 35 shows the configuration of the system provided with one output server, but the system may also be provided with a plurality of output servers. FIG. 42 is a diagram showing an example where there are two output servers. In the same figure, there are output server 3500A and output server 3500B, and the server 106 selects either of those output servers and sends the data to the selected output server. The output server 3500A or the output server 3500B is provided with data memory 3503A or data memory 3503B, respectively.

Figure 43:
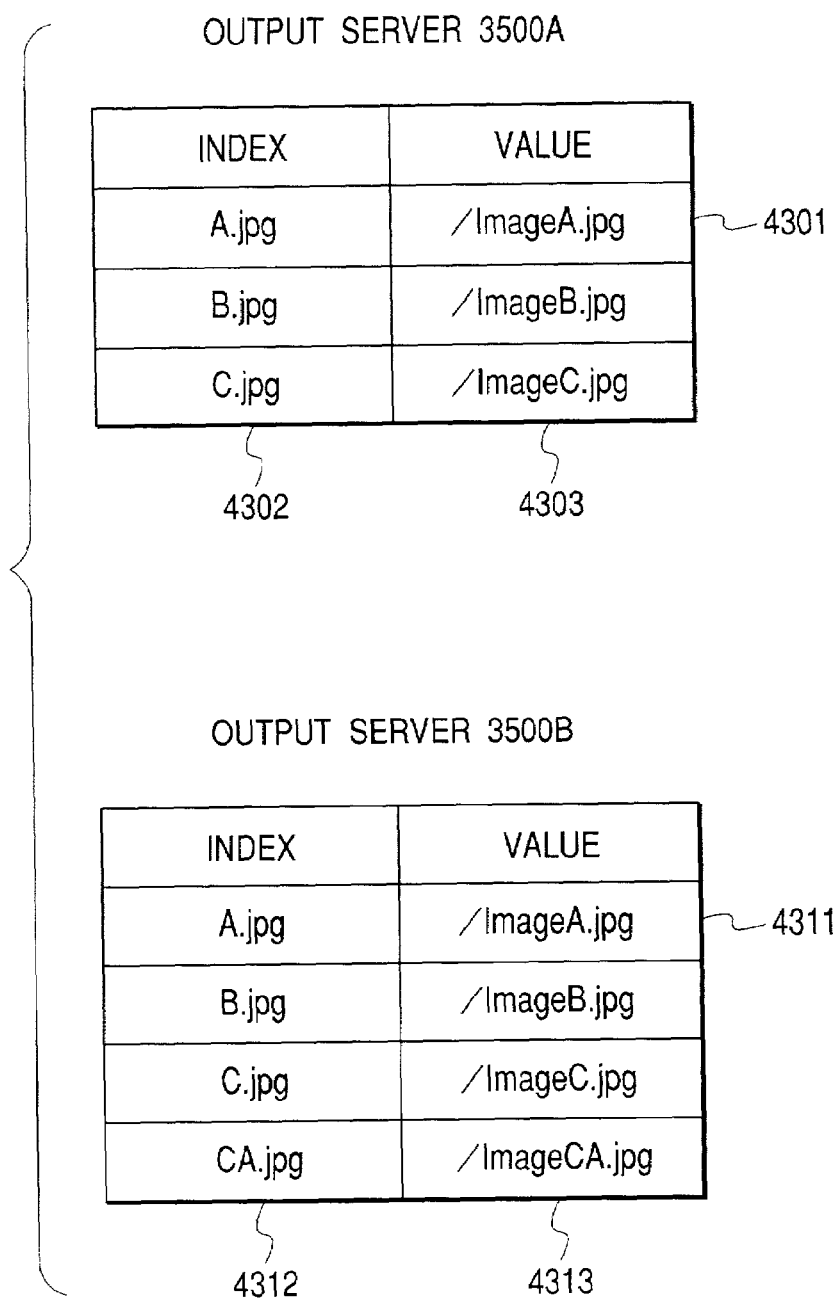
FIG. 43 is a diagram showing data storage ways in data memory 3503A and in data memory 3503B of FIG. 42.

FIG. 43 is a diagram showing data storage methods in the data memory 3503A and in the data memory 3503B of FIG. 42. Numeral 4301 designates an example of data stored in the data memory 3503A of the output server 3500A. Numeral 4302 denotes indices used upon a search for data stored. Numeral 4303 denotes values corresponding to the respective indices, which are file names indicating positions of the data in the file system in the output server in the present example. Likewise, numeral 4311 represents an example of the data stored in the data memory 3503B of the output server 3500B. Numeral 4312 represents indices used upon a search for data stored. Numeral 4313 denotes values corresponding to the respective indices, which are file names indicating positions of the data in the file system in the output server in the present example. FIG. 43 shows that the data indicated by the index CA.jpg is absent at the output server 3500A while the data indicated by the index CA.jpg is present at the output server 3500B. The output servers can save these information during a period of processing from a time of startup to a previous request. It can also be implemented by directly setting the data in the output servers.

Figure 44:
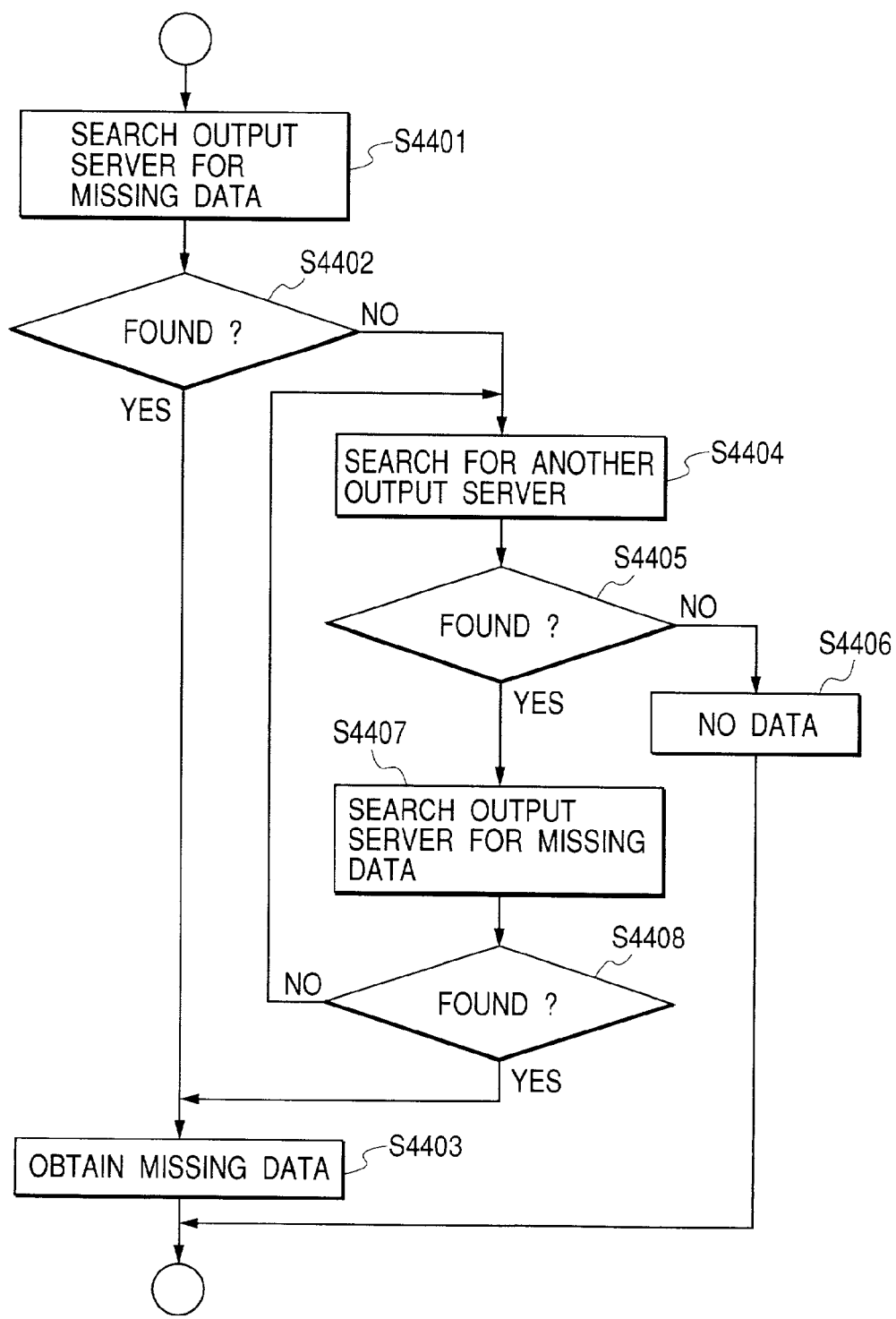
FIG. 44 is a flowchart showing the details of processing for acquiring missing data.

FIG. 44 is a flowchart to detail the processing of acquiring the missing data at step S4104. The operation of the flowchart is carried out by a program operating on the output server.

At first step S4401, the missing data is searched for on the output server designated as an output object. At next step S4402, whether data was found is determined based on the result of the search. For example, suppose the index of the missing data is CA.jpg and the information in the data memory of the output server is in the state of 4301 in FIG. 43. Since the index group consists of only A.jpg, B.jpg and C.jpg, the data of interest is not found there. For example, suppose the index of the missing data is CA.jpg and the information in the data memory is 4311 of FIG. 43. Since the index group includes CA.jpg, the data of interest is found there.

When the data is found, the flow proceeds to step S4403. When not found, the flow goes to step S4404. At step S4403, the missing data is retrieved in order to utilize the found data for generation of chit image.

At step S4404, a search is conducted to determine whether there exists another accessible output server on the network in order to acquire the data corresponding to the missing data from the other output server. The search can be done by making use of either of common network search methods like the broadcast. At step S4405, whether another output server was found is determined based on the result of the search at S4404. When there exists an accessible server, the flow proceeds to step S4407. When there exists no accessible server, the flow proceeds to step S4406.

At step S4407, the missing data is searched for by making use of the other output server thus found. The search is conducted through mutual communications between the data I/O unit of the output server 3500A and the data I/O unit of the output server 3500B. For example, supposing the output server 3500A issues a request for a search for the missing data to the output server 3500B, the output server 3500B carries out the actual search and sends the result of the search through the network to the output server 3500A.

At step S4408, whether the missing data was found is again determined. When it was found, the data is retrieved at step S4403. When it was not found, the flow returns to step S4404 to conduct a further search for still another output server and find the missing data. However, an output server already found to exclude the missing data is excepted from the search.

Arrival at step S4406 means that there is no output server to be searched for at last, and it is thus determined that the missing data was not found. In this case, no data is inserted into the generated chit, or no image is generated at all on the presumption of an error.

As described above, according to the present invention, the data necessary for generation of print data is not distributed to the client, but to the output server, and the output server converts the data thus distributed, to the printer-digestible data, whereby the print processing can be efficiently carried out without imposing a load on the client.

The output server is also able to print data absent at the server, by the search via the network for part of data necessary for the generation of print data.

<Encipher and Compression>

Figure 28:
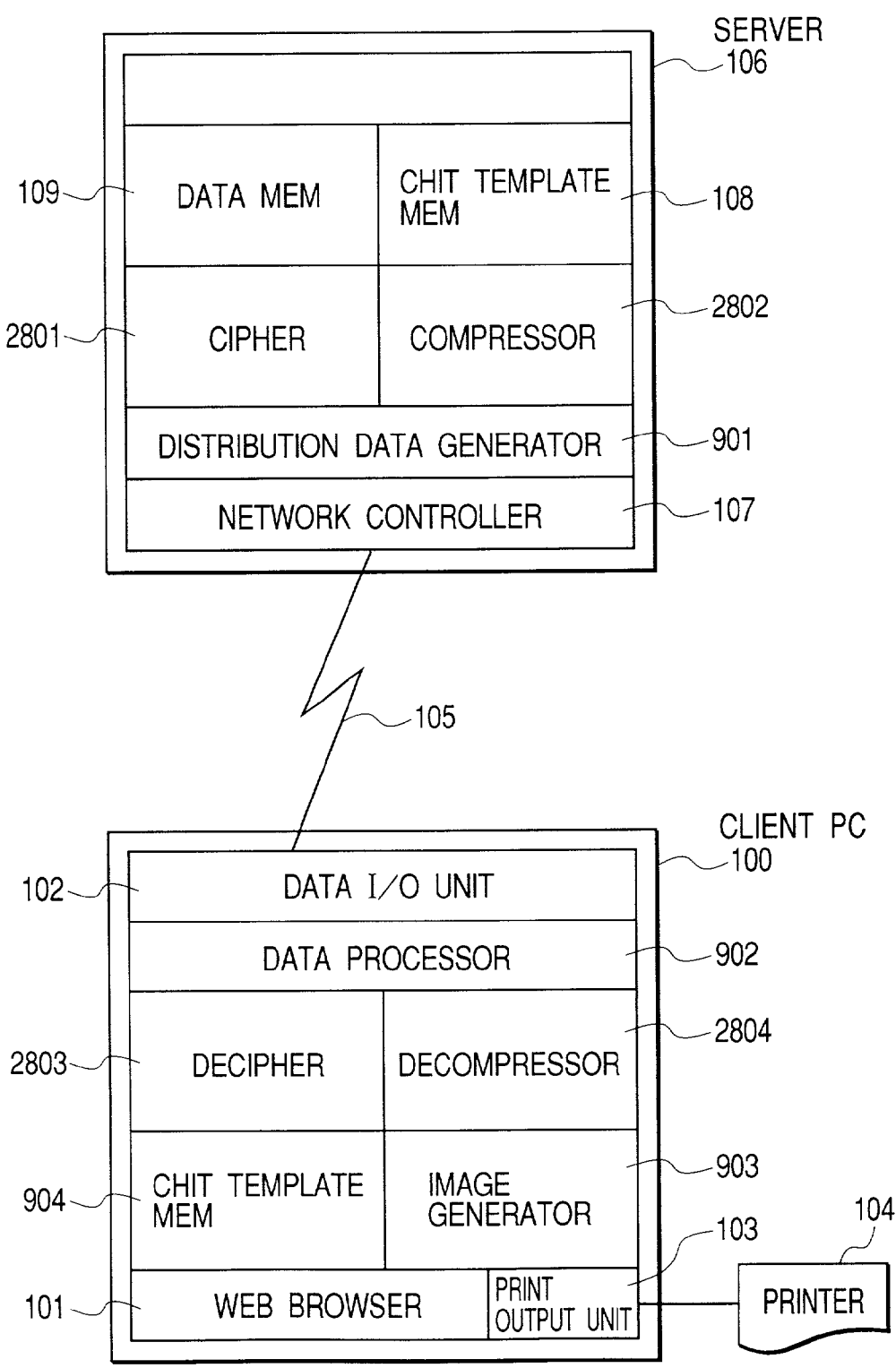
FIG. 28 is a functional block diagram of a chit print system capable of enciphering and compressing distribution data.

The following will describe a method for the server 106 to encipher the distribution data, compress the ciphered data, and send the compressed data to the client 100. FIG. 28 is a functional block diagram of a chit print system capable of enciphering and compressing the distribution data. In this print system, the server 106 has new components of ciphered data generator 2801 (referred to as cipher 2801) and compressed data generator 2802 (referred to as compressor 2802), and the client 100 new components of ciphered data decipher (decipher) 2803 and compressed data decompressor (decompressor) 2804.

The cipher 2801 represents a part for carrying out encryption of data by a designated enciphering method on the occasion of generating the distribution data to be distributed to the client 100. The cipher 2801 is loaded with a program code for implementing at least one cipher method. The compressor 2802 compresses data by a designated compression method on the occasion of generating the distribution data to be distributed to the client 100. The compressor 2802 is loaded with a program code for implementing at least one compression method.

The decipher 2803 represents a part for carrying out cryptanalysis when the ciphered chit data and chit form are extracted from the data distributed from the server 106. The decompressor 2804 carries out decompression on the occasion of extracting the chit data and chit form from the data distributed from the server 106.

Figure 29:
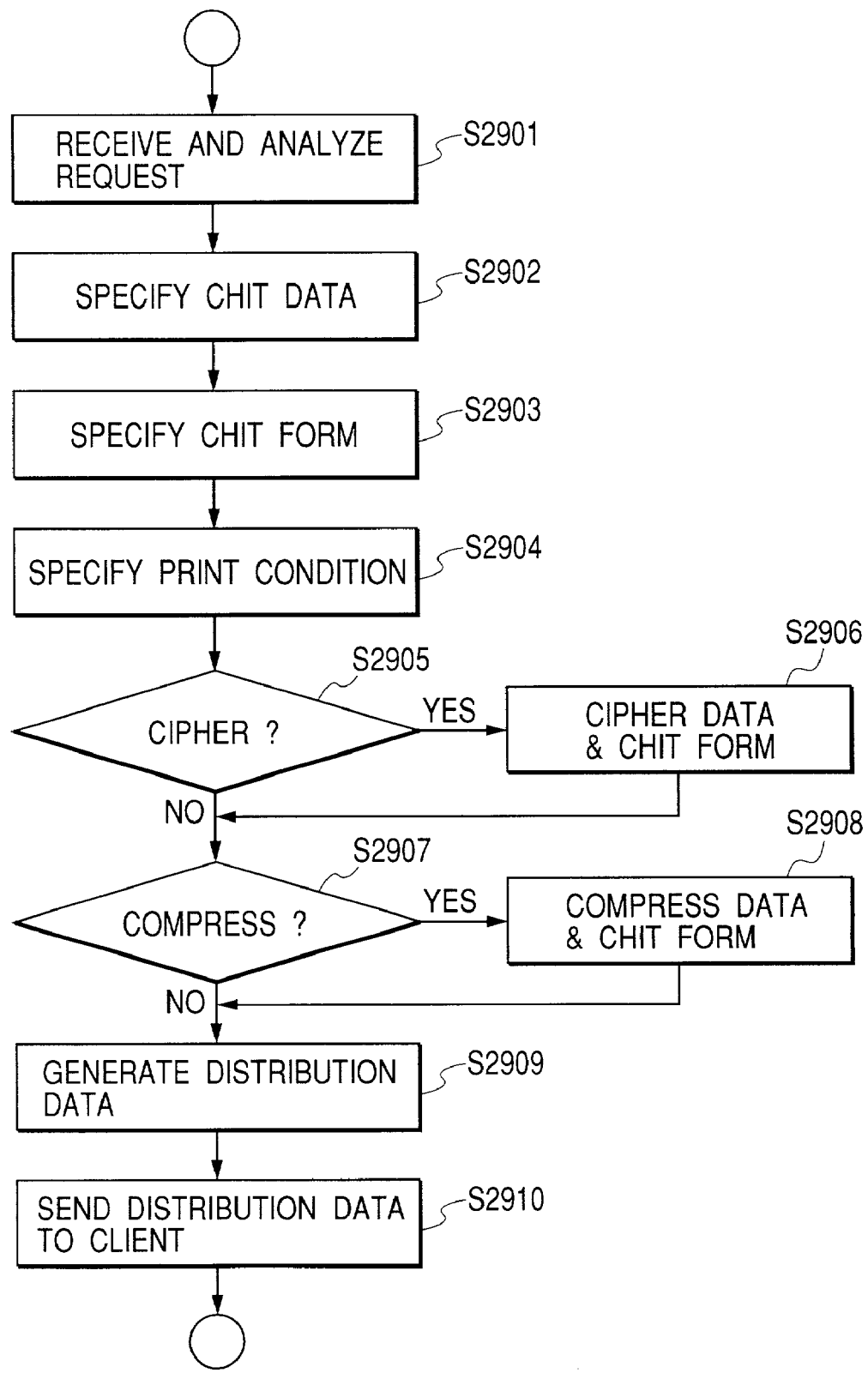
FIG. 29 is a flowchart of processing up to generation of distribution data, which is carried out by the server receiving the print request from the client.

FIG. 29 is a flowchart of processing up to generation of distribution data, which is carried out by the server 106 receiving a print request from the client 100. Steps S2901, S2902, S2903, S2904, S2905, S2907 and S2909 are executed by the distribution data generator 901, step S2906 by the cipher 2801, step S2908 by the compressor 2802, and step S2910 by the network communication controller 106.

At first step S2901 the distribution data generator 901 analyzes the request (HTTP request) received from the Web browser 101, and at steps S2902 and S2903 the distribution data generator 901 specifies the data necessary for generation of the chit print data requested by the client 100; particularly, the chit form and chit data. At further step S2904, the distribution data generator 901 specifies the printer information, the number of prints, etc. (which will be called together a print condition) in execution of print by the printer after generation of an image at the client 100.

At step S2905, the distribution data generator 901 determines whether there exists a parameter designating encryption, in the print request. When the parameter is present, the cipher 2801 enciphers the data and chit form at step S2906. At step S2907, the distribution data generator 901 determines whether there exists a parameter designating compression, in the print request. When it is present, the compressor 2802 compresses the data and chit form at step S2908.

At step S2909, the distribution data generator 901 synthesizes one data from the information necessary for generation of the image specified at steps S2902, S2903 and S2904 to generate the distribution data. A parameter indicating on/off of encryption and compression is added to the distribution data according to whether or not the data is enciphered and whether or not the data is compressed. Then the network controller 106 sends the distribution data thus generated, to the client 100 at step S2910.

Figure 30:
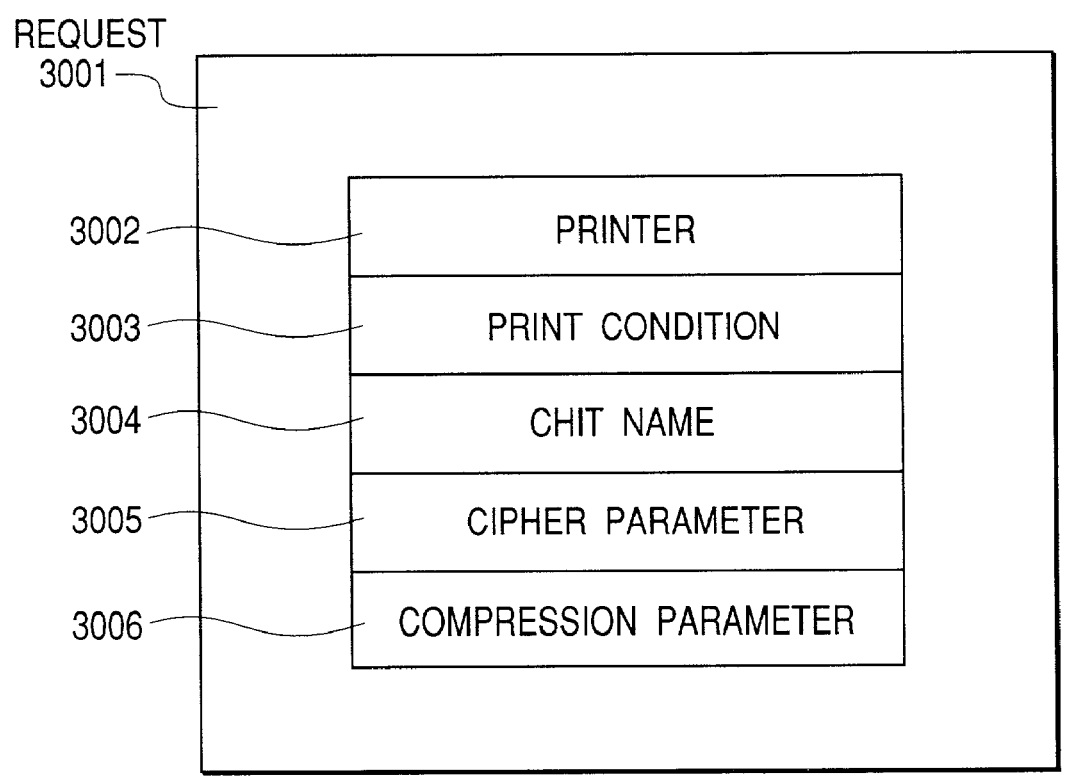
FIG. 30 is a diagram showing information included in the print request (HTTP request) received from the client.

FIG. 30 shows the information included in the print request (HTTP request) received from the client 100. Numeral 3001 denotes the HTTP request itself sent from the client 100. Numeral 3002 denotes the output printer information concerning the printer designated by the client 100. Numeral 3003 designates the print condition including a name of a chit designated for generation of the image, the number of prints, designation of both-side or single-side print, designation of a tray of the printer, and so on. Numeral 3004 represents a print chit name selected at the client 100.

Numeral 3005 represents a parameter as an instruction of whether encryption is to be carried out on the server 106 side, which is set according to user's selection upon the issue of the print request. Numeral 3306 represents a parameter as an instruction of whether compression is to be carried out on the server 106 side, which is set according to user's selection upon the issue of the print request.

Figure 31:
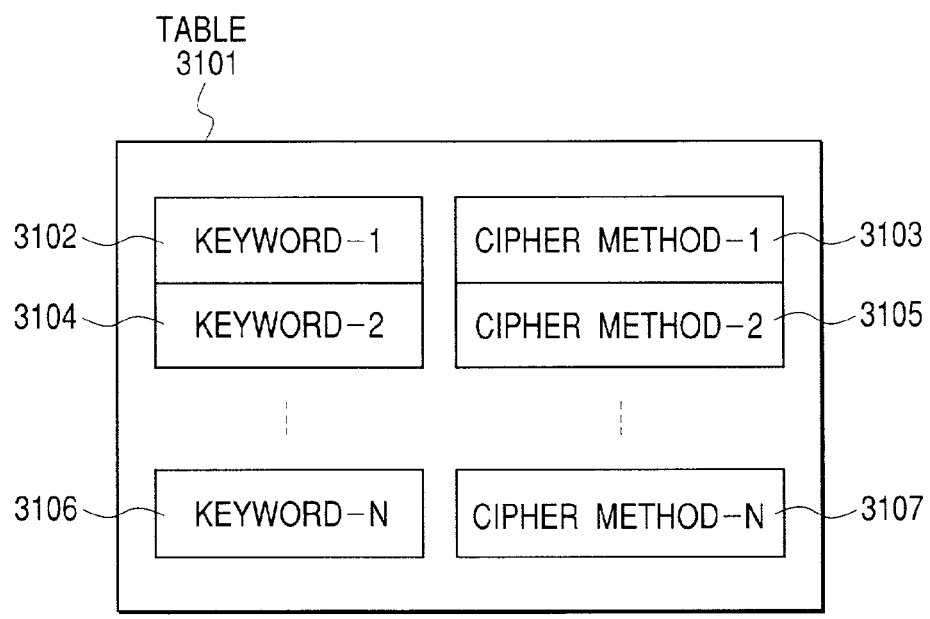
FIG. 31 is a table to determine which cipher method is used for cryptography.

A cipher method is selected as follows. FIG. 31 shows a table 3101 to determine which cipher method is to be used for encryption. This table includes combinations of keywords 3102, 3104, 3106 representing respective cipher methods, with the cipher methods 3103, 3105, 3107.

Which keyword is to be selected out of the keywords 3102, 3104, 3106 is described in environment setting information of the server 106. Assigned to each keyword is a character string that does not allow analogy of an actual cipher method from itself.

Figure 32:
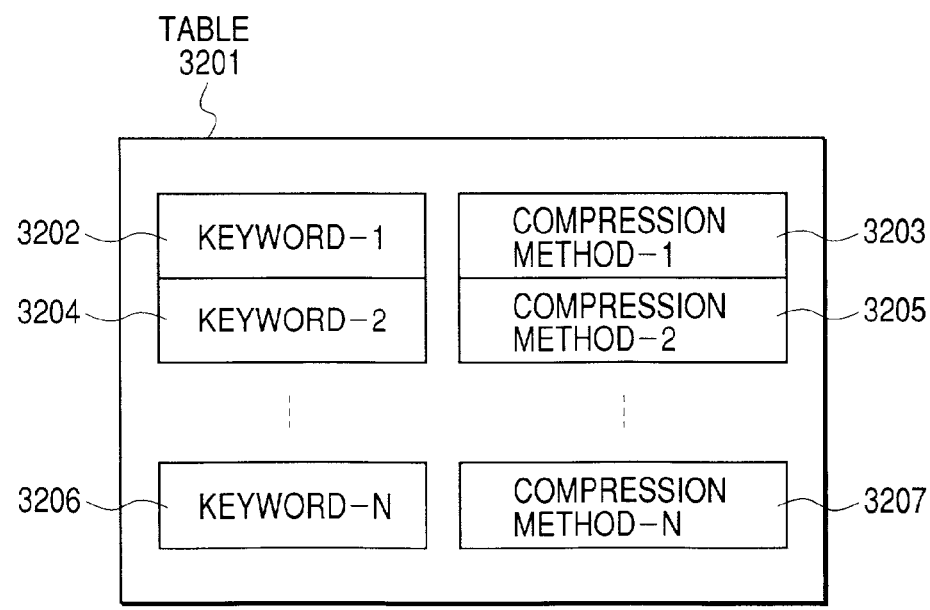
FIG. 32 is a table to determine which compression method is used for compression.

A compression method is selected as follows. FIG. 32 shows a table 3201 to determine which compression method is to be used for compression. This table includes combinations of keywords 3202, 3204, 3206 representing respective compression methods, with the compression methods 3203, 3205, 3207.

Which is to be selected out of the keywords 3202, 3204, 3206 is described in the environment setting information of the server 106. Assigned to each keyword is a character string that does not allow analogy of an actual compression method from itself.

The following will describe how to determine and how to execute the encryption and compression methods. At step S2905, when the parameter 3005 in the request is on, the distribution data generator 901 judges as YES. At step S2906, the server 106 then determines a cipher method with reference to the table of FIG. 31, based on the keyword described in the environment setting information.

Compression is also determined in similar fashion. At step S2907, when the parameter 3006 in the request is on, the distribution data generator 901 judges as YES. At next step S2908, the server 106 determines a compression method with reference to the table of FIG. 32, based on the keyword described in the environment setting information.

The data and chit form thus enciphered and compressed are combined at step S2909 to constitute part of the distribution data. The distribution data is also accompanied by the keywords for the cipher and compression methods acquired from the environment setting information and is sent to the client 100.

Figure 33:
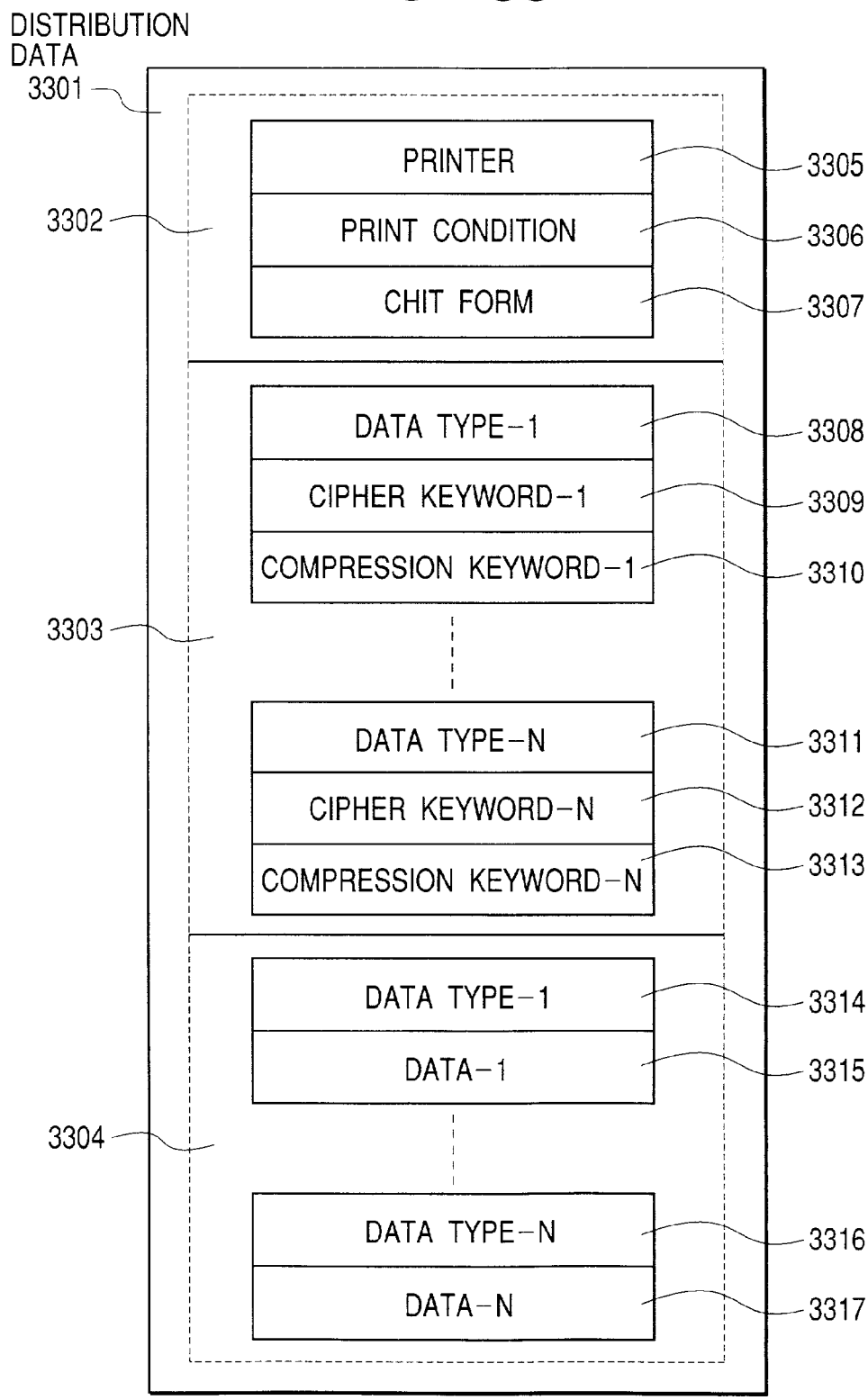
FIG. 33 is a diagram showing distribution data generated by the server.

FIG. 33 is a diagram showing the distribution data generated at the server 106. Numeral 3301 indicates the whole distribution data distributed to the client 100.

Numeral 3302 stands for a header part of the distribution data. Numeral 3305 denotes a field storing the output printer information. Numeral 3306 denotes a field storing the information about the print condition. Numeral 3307 indicates the chit form specified at step S2903, based on the chit name designated.

Numeral 3303 represents a modifier of the distribution data. The modifier 3303 includes, for each data type, a keyword for specifying a cipher method for the data of the type and a keyword for specifying a compression method for the data of the type. There can exist a plurality of data types, and the keywords are stored for each of the data types.

Numeral 3304 denotes a data part of the distribution data. The data part 3304 stores the data itself, i.e., the data necessary for generation of an image for each of the data types.

In the modifier 3303, different cipher methods and compression methods can be designated for the respective types of data whereby it becomes harder for a third party to decipher or falsify the distribution data.

Figure 34:
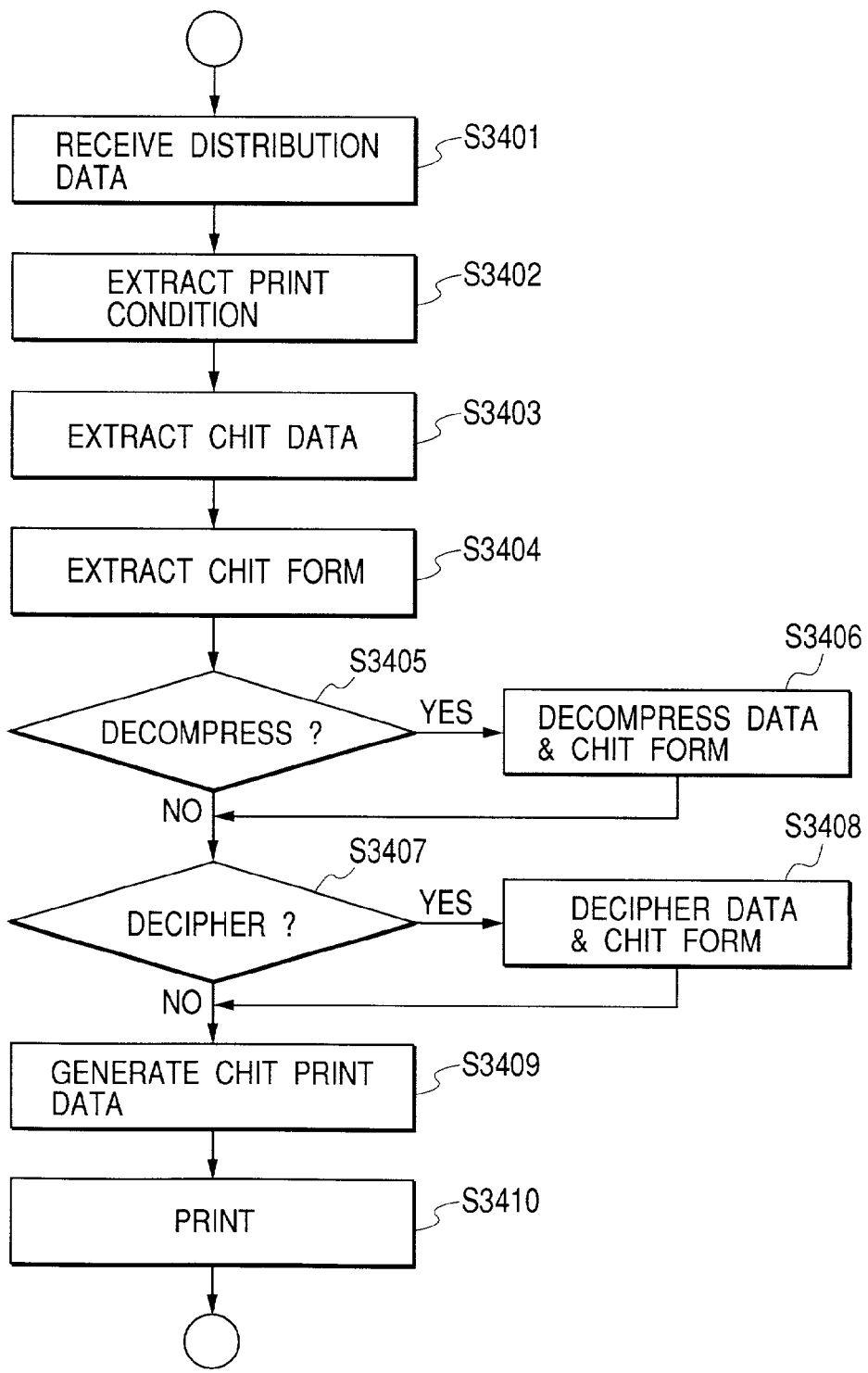
FIG. 34 is a flowchart of processing in which the client receiving the distribution data from the server, generates an image and prints it.

FIG. 34 is a flowchart of processing in which the client 100 receiving the distribution data from the server 106 generates an image and prints it. Step S3401 is executed by the data I/O unit 102, steps S3402, S3403, S3404, S3405 and S3407 by the data processor 902, step S3406 by the decipher 2803, step S3408 by the decompressor 2804, step S3409 by the image generator 903, and step S3410 by the print output unit 103.

At step S3401, the data I/O unit 102 receives the distribution data generated at the server 106. At step S3402 the data processor 902 extracts the print condition from the distribution data received at step S3401 to store it in the memory, and at step S3403 the data processor extracts the chit data necessary for print of the chit and stores it as a file. At step S3404, the data processor 902 extracts the chit form necessary for generation of an image and stores it as a file.

At step S3405, the data processor 902 determines whether there exists the parameter indicating the necessity for execution of decompression for the distribution data. When the parameter is present, the decompressor 2804 decompresses the data and chit form at step S3406. At step S3407, the data processor 902 determines whether there exists the parameter indicating the necessity for execution of cryptanalysis for the distribution data. When the parameter is present, the decipher 2803 deciphers the data and chit form at step S3408.

At step S3409, the image generator 903 generates the chit print data, based on the information extracted at steps S3402, S3403 and S3404. A generating method of the chit print data at this time is equivalent to steps S602, S603, S604, S605 and S606 of FIG. 6. At next step S3410, the print output unit 103 makes the printer print the image, based on the chit print data.

As described above, the client 100 receiving the data necessary for the generation of image determines at step S3405 whether the decompression work is necessary. The determination is made based on the keyword indicating the compression method included in the distribution data. When the original data is judged to be compressed one, the decompressor detects the compression method from the table of FIG. 31 and decompresses the data at step S3406.

The cryptanalysis is also carried out in similar fashion. At step S3407, the data processor determines whether the decipher work is necessary. The determination is made based on the keyword indicating the cipher method included in the distribution data. When the original data is judged to be ciphered one, the decompressor detects the cipher method from the table of FIG. 32 and deciphers the data at step S3408.

As described above, the present invention is characterized in that the encipher and compression methods are determined by the tables inside the system, the distribution data distributed through the network is accompanied by only their keywords, and it is made difficult thereby to restore the original data from only the distribution data, thereby preventing falsification of the data.

The data for generation of image distributed from the server 106 includes the descriptions indicating the data compression method and the cipher method for prevention of falsification, and the compression and encryption of data can be carried out by the means, which enhances the security for the data distribution.

<Program Codes and Recording Media>

Figures 46, 47:
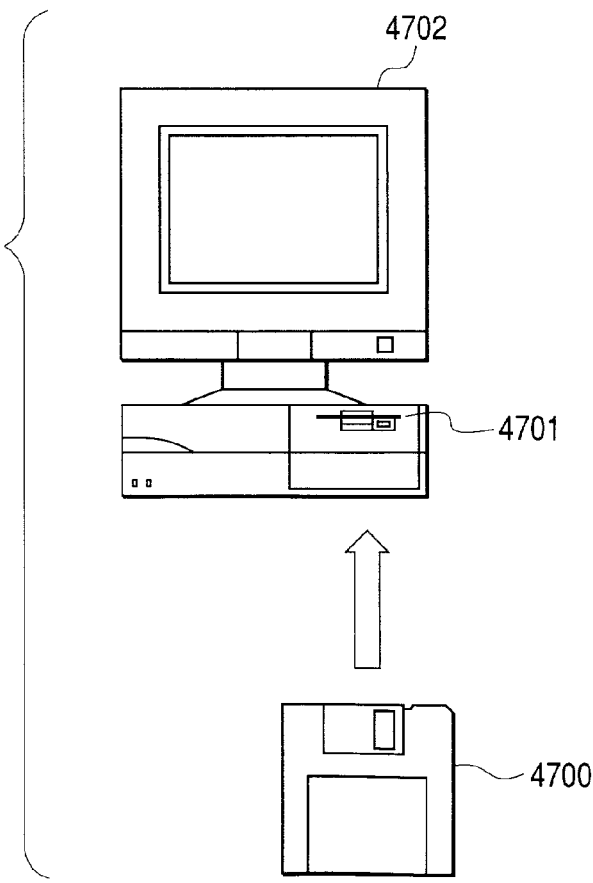
FIG. 46 is a diagram showing a memory map in a state in which programs are loaded on the memory and can be executed by a CPU.
FIG. 47 is a drawing to show a method of feeding programs and data to a computer.

The program codes and associated data according to the present invention are stored in a floppy disk (FD) or a CD-ROM and supplied therefrom to a computer. FIG. 45 is a diagram showing a memory map in a state in which the programs according to the present invention are loaded on the memory 303 and are executable by the CPU 302. The memory stores the program codes corresponding to the respective flowcharts of FIGS. 6, 7, 8, 10, 14, 17, 18, 19, 20, 25, 29 and 34. FIG. 46 is a diagram showing a memory map in a state in which the programs according to the present invention are loaded on the memory 303 and are executable by the CPU 302. The memory stores the program codes corresponding to the respective flowcharts of FIGS. 6, 7, 8, 40, 41 and 44.

The object of the present invention is achieved in such a way that the memory (FIG. 45) storing the program codes of software (control programs) for implementing the functions of the foregoing embodiments is supplied to the computer, as shown in FIG. 47, and the device (CPU 302) of the computer reads in and executes the program codes stored in the memory.

A popular method of supplying the programs and data shown in FIG. 45 or 46, to the computer is a method of supplying a floppy disk FD 4700 storing them to computer body 4702 (through floppy disk drive 4701), as shown in FIG. 47. In this case, the program codes themselves read out of the memory implement the functions of the aforementioned embodiments and the memory storing the program codes constitutes the present invention.

The memory for supply of the program codes can be, for example, either of an optical disk, a magnetooptical disk, a CD-ROM, a CD-R, a magnetic tape, a nonvolatile memory card, a ROM, and so on, in addition to the floppy disk and the hard disk. In addition to the configuration wherein the computer executes the program codes thus read to implement the functions of the aforementioned embodiments, it is needless to mention that the present invention also embraces a configuration wherein, based on instructions of the program codes, an OS (operating system) operating on the computer executes part or the whole of actual processing and the processing implements the functions of the aforementioned embodiments. Further, it is also a matter of course that the invention also embraces a configuration wherein the program codes read out of the memory are written into a memory provided in an extension board inserted into the computer or in an extension unit connected to the computer and thereafter, based on instructions of the program codes, a CPU or the like in the extension board or in the extension unit executes part or the whole of actual processing to implement the functions of the aforementioned embodiments.

What is claimed is:

1. An information processing apparatus comprising:
   acquiring means for, in response to a request from an external device, acquiring a template for generation of print data corresponding to a display screen displayed at said external device, and data to be inserted in said template; and
   transmission control means for causing the template and data acquired by said acquiring means, to be sent to said external device,
   wherein information indicating a template absent at said external device out of said templates for generation of said print data is received from said external device and said transmission control means causes said template absent at said external device to be sent to said external device.

2. The information processing apparatus according to claim 1, wherein said template is combined with said data to generate distribution data and said transmission control means causes said distribution data to be sent to said external device.

3. The information processing apparatus according to claim 1, further comprising second transmission control means for causing information indicating said template for generation of said print data and update time information of the template to be sent to said external device.

4. The information processing apparatus according to claim 1, further comprising second transmission control means for causing a program code for sending information indicating a template absent at said external device thereto, which is executed by said external device, to be sent to said external device.

5. The information processing apparatus according to claim 1, wherein said display screen is a page screen displayed on a Web browser and the request from said external device is transferred through communication between the Web browser of said external device and a Web server of said information processing apparatus.

6. The information processing apparatus according to claim 1, further comprising determining means for analyzing said request to determine a transmission mode, either a mode of sending all said templates for generation of said print data to said external device or a mode of sending only a template absent at said external device to said external device.

7. The information processing apparatus according to claim 1, further comprising determining means for determining a transmission mode, either a mode of transmitting said template and said data to said external device or a mode of generating said print data and sending said print data to said external device.

8. The information processing apparatus according to claim 1, further comprising enciphering means for enciphering said template and said data, wherein said transmission control means causes information indicating an enciphering method used in said enciphering means, to be sent to said external device.

9. The information processing apparatus according to claim 1, further comprising compressing means for compressing said template and said data, wherein said transmission control means causes information indicating a compression method used in said compressing means, to be sent to said external device.

10. An information processing method comprising:
    an acquiring step of, in response to a request from an external device, acquiring a template for generation of print data corresponding to a display screen displayed at said external device, and data to be inserted in said template; and
    a transmission control step of causing the template and data acquired by said acquiring step, to be sent to said external device,
    wherein information indicating a template absent at said external device out of said templates for generation of said print data is received from said external device and said transmission control step causes said template absent at said external device to be sent to said external device.

11. The information processing method according to claim 10, wherein said template is combined with said data to generate distribution data and said transmission control step causes said distribution data to be sent to said external device.

12. The information processing method according to claim 10, further comprising a second transmission control step of causing information indicating said template for generation of said print data and update time information of the template to be sent to said external device.

13. The information processing method according to claim 10, further comprising a second transmission control step of causing a program code for sending information indicating a template absent at said external device thereto, which is executed by said external device, to be sent to said external device.

14. The information processing method according to claim 10, wherein said display screen is a page screen displayed on a Web browser and the request from said external device is transferred through communication between the Web browser of said external device and a Web server.

15. The information processing method according to claim 10, further comprising a determination step of analyzing said request to determine a transmission mode, either a mode of sending all said templates for generation of said print data to said external device or a mode of sending only a template absent at said external device to said external device.

16. The information processing method according to claim 10, further comprising a determination step of determining a transmission mode, either a mode of transmitting said template and said data to said external device or a mode of generating said print data and sending said print data to said external device.

17. The information processing method according to claim 10, further comprising an enciphering step of enciphering said template and said data, wherein said transmission control step causes information indicating an enciphering method used in said enciphering step, to be sent to said external device.

18. The information processing method according to claim 10, further comprising a compression step of compressing said template and said data, wherein said transmission control step causes information indicating a compression method used in said compression step, to be sent to said external device.

19. An information processing program to make a computer execute the following steps:
   an acquiring step of, in response to a request from an external device, acquiring a template for generation of print data corresponding to a display screen displayed at said external device, and data to be inserted in said template; and
   a transmission control step of causing the template and data acquired by said acquiring step, to be sent to said external device,
   wherein information indicating a template absent at said external device out of said templates for generation of said print data is received from said external device and said transmission control step causes said template absent at said external device to be sent to said external device.

20. The information processing program according to claim 19, wherein said template is combined with said data to generate distribution data and said transmission control step causes said distribution data to be sent to said external device.

21. The information processing program according to claim 19 to make the computer execute a second transmission control step of causing information indicating said template for generation of said print data and update time information of the template to be sent to said external device.

22. The information processing program according to claim 19 to make the computer execute a second transmission control step of causing a program code for sending information indicating a template absent at said external device thereto, which is executed by said external device, to be sent to said external device.

23. The information processing program according to claim 19, wherein said display screen is a page screen displayed on a Web browser and the request from said external device is transferred through communication between the Web browser of said external device and a Web server.

24. The information processing program according to claim 19 to make the computer execute a determination step of analyzing said request to determine a transmission mode, either a mode of sending all said templates for generation of said print data to said external device or a mode of sending only a template absent at said external device to said external device.

25. The information processing program according to claim 19 to make the computer execute a determination step of determining a transmission mode, either a mode of transmitting said template and said data to said external device or a mode of generating said print data and sending said print data to said external device.

26. The information processing program according to claim 19 to make the computer execute an enciphering step of enciphering said template and said data, wherein said transmission control step causes information indicating an enciphering method used in said enciphering step, to be sent to said external device.

27. The information processing program according to claim 19 to make the computer execute a compression step of compressing said template and said data, wherein said transmission control step causes information indicating a compression method used in said compression step, to be sent to said external device.

28. A computer-readable memory storing an information processing program to make a computer execute the following steps:
   an acquiring step of, in response to a request from an external device, acquiring a template for generation of print data corresponding to a display screen displayed at said external device, and data to be inserted in said template; and
   a transmission control step of causing the template and data acquired by said acquiring step, to be sent to said external device,
   wherein information indicating a template absent at said external device out of said templates for generation of said print data is received from said external device and said transmission control step causes said template absent at said external device to be sent to said external device.

29. A print system comprising a server and a client, wherein said server comprises:
   acquiring means for, in response to a request from the client, acquiring a template for generation of print data corresponding to a display screen displayed at said client, and data to be inserted in said template; and
   transmission control means for causing the template and data acquired by said acquiring means, to be sent to said client,
   wherein said client comprises:
   generating means for generating said print data at said client, based on the template and data sent by said transmission control means, and
   wherein information indicating a template absent at said external device out of said templates for generation of said print data is received from said external device and said transmission control means causes said template absent at said external device to be sent to said external device.

* * * * *